(12) United States Patent
Hikabe

(10) Patent No.: US 8,244,949 B2
(45) Date of Patent: Aug. 14, 2012

(54) SLOT INTERFACE ACCESS UNIT, METHOD THEREOF, AND PROGRAM THEREOF, AS WELL AS REDUNDANCY CONFIGURATION OF MAIN UNIT, AND REPLACING METHOD OF THE SAME

(75) Inventor: Akinori Hikabe, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 302 days.

(21) Appl. No.: 12/265,805

(22) Filed: Nov. 6, 2008

(65) Prior Publication Data

US 2009/0287954 A1 Nov. 19, 2009

(30) Foreign Application Priority Data

May 19, 2008 (JP) ................................ 2008-130780

(51) Int. Cl.
*G06F 13/14* (2006.01)
(52) U.S. Cl. ......................................... 710/301; 710/10
(58) Field of Classification Search .......... 710/300–317, 710/8–19, 62–64, 72
See application file for complete search history.

(56) References Cited

U.S. PATENT DOCUMENTS

| | | | | |
|---|---|---|---|---|
| 4,994,963 A | * | 2/1991 | Rorden et al. | 710/305 |
| 5,295,578 A | * | 3/1994 | Neidospial et al. | 206/408 |
| 5,305,355 A | | 4/1994 | Go et al. | |
| 5,333,277 A | * | 7/1994 | Searls | 710/300 |
| 5,530,946 A | | 6/1996 | Bouvier et al. | |
| 5,655,149 A | * | 8/1997 | Muegge et al. | 710/10 |
| 5,717,852 A | | 2/1998 | Izuno et al. | |
| 6,636,929 B1 | * | 10/2003 | Frantz et al. | 710/313 |
| 6,928,503 B1 | * | 8/2005 | Mosgrove | 710/302 |
| 7,145,447 B2 | * | 12/2006 | Yamanoi et al. | 340/457.1 |
| 7,293,192 B2 | | 11/2007 | Allen et al. | |
| 7,409,478 B2 | * | 8/2008 | Kreiner et al. | 710/62 |
| 7,418,525 B2 | * | 8/2008 | Dalton et al. | 710/5 |
| 7,457,236 B2 | | 11/2008 | Cheng et al. | |
| 7,554,274 B2 | | 6/2009 | Wang et al. | |
| 7,664,909 B2 | * | 2/2010 | Pettey | 711/112 |

(Continued)

FOREIGN PATENT DOCUMENTS

EP 1 993 232 11/2008

(Continued)

OTHER PUBLICATIONS

Sugerman J et al: "Virtualizing I/O devices on VMware Workstation's hosted virtual machine monitor" Proceedings of the Usenix Annual Techical Conference, XX, XX Jun. 25, 2001, pp. 1-14, XP002250150.

(Continued)

*Primary Examiner* — Raymond Phan
(74) *Attorney, Agent, or Firm* — Young & Thompson

(57) ABSTRACT

A single main unit manages information on hardware resources and the like of all main units connected to a network in an integrated fashion. A slot management module, a slot control module, and a physical slot/managed slot comparison table are provided between an input/output control module and a slot interface subordinate thereto. The input/output control module accesses the slot interface by using virtual slot identification information. The slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface.

17 Claims, 36 Drawing Sheets

U.S. PATENT DOCUMENTS

| | | | |
|---|---|---|---|
| 7,827,333 B1 * | 11/2010 | Wyatt et al. | 710/104 |
| 2002/0010750 A1 | 1/2002 | Baretzki | |
| 2003/0193896 A1 | 10/2003 | De Groote et al. | |
| 2004/0085965 A1 | 5/2004 | Fotedar | |
| 2004/0260977 A1 | 12/2004 | Ji et al. | |
| 2005/0015657 A1 | 1/2005 | Sugiura et al. | |
| 2006/0203725 A1 | 9/2006 | Paul et al. | |
| 2008/0294828 A1 * | 11/2008 | Hikabe | 710/300 |

FOREIGN PATENT DOCUMENTS

| | | |
|---|---|---|
| JP | 04-281548 | 10/1992 |
| JP | 05-108687 | 4/1993 |
| JP | 2001-043105 | 2/2001 |
| JP | 2001-358736 | 12/2001 |
| JP | 2006-186482 | 7/2006 |
| JP | 2007-020233 | 1/2007 |
| JP | 2007-132955 | 5/2007 |
| JP | 2007-133959 | 5/2007 |
| WO | WO97/35255 | 9/1997 |
| WO | 01/25934 | 4/2001 |

OTHER PUBLICATIONS

European Patent Office issued an European Search Report dated Jul. 2, 2009, Application No. 08168715.4.

Japanese Office Action dated Nov. 24, 2011 in corresponding Japanese Application No. 2008-130780 with partial English translation.

Official Action dated Jan. 4, 2012 issued by U.S. Patent Office in U.S. Appl. No. 13/275,969.

* cited by examiner

FIG.8

| PHYSICAL SLOT | VIRTUAL SLOT |
|---|---|
| SYSTEM 1, SLOT 1 | SLOT 1 |
| SYSTEM 1, SLOT 2 | SLOT 2 |
| SYSTEM 2, SLOT 1 | SLOT 3 |
| SYSTEM 3, SLOT 1 | SLOT 4 |
| SYSTEM 3, SLOT 2 | SLOT 5 |
|  |  |

SLOT INTERFACE ACCESS UNIT, METHOD THEREOF, AND PROGRAM THEREOF, AS WELL AS REDUNDANCY CONFIGURATION OF MAIN UNIT, AND REPLACING METHOD OF THE SAME

RELATED APPLICATIONS

This application is based upon and claims the benefit of priority from Japanese patent application No. 2008-130780, filed on May 19, 2008, the disclosure of which is incorporated herein in its entirety by reference.

BACKGROUND OF THE INVENTION

1. Field of the Invention

The present invention relates to a slot interface access unit for accessing slot interfaces that are distributed between a plurality of main units, a method thereof and a program thereof.

The present invention also relates to a redundancy configuration of a main unit and a replacing method of a main unit, by which a plurality of main units are installed and when a main unit to be a master ceases to function properly, another main unit is operated as a substitute master main unit.

2. Description of the Related Art

There have heretofore been technologies for connecting main units over a network so that the main units can mutually use each other's functions. As employed herein, a main unit refers to an apparatus which has an interface for accommodating terminals (such as key telephones), an interface for connecting to a public line, or an interface for connecting to an IP network.

Patent Document 1: International Publication WO 1997/35255 pamphlet
Patent Document 2: JP 2001-358736-A In order for a main unit to use the functions of other main units over the network, however, modifications have had to the respective functions. Unmodified functions are not network-compatible, and it has been impossible for all the functions of one main unit to be used by another main unit via the network.

More specifically, with conventional networking connections between the main units, the main units have managed resources by using their respective CPUs, as well as the states of terminals, lines, and the like separately. To run the functions of the main units over the network has thus been not as easy as to run them on each single main unit, and has required that the functions be modified so as to be network-compatible.

In conventional networking systems, package slots, i.e., the resources of the main units have been separately managed system by system, so that the systems have had no access to each other's resource information, conditions, and the like. This has caused a limitation in using the functions of the main units over the network.

SUMMARY OF THE INVENTION

In view of the foregoing, it is therefore an object of the present invention to manage information on hardware resources and the like of all network-connected main units by a single main unit in an integrated fashion, thereby facilitating information management to achieve networking with no functional limitations.

The present invention avoids the conventional problems by a single main unit managing all the resource information, which has been managed by the individual main units, in an integrated fashion and by the single main unit performing call control collectively.

More specifically, a single main unit monitors and controls all terminals, lines, and the like of the other main units connected to the network collectively so that the resources on the network can be handled as if connected to the own main unit.

In other words, the terminals and lines of the other systems can be handled as if they are the own terminals and lines. This eliminates the need to modify the functions of the main units so as to be network-compatible as heretofore, and even the need to be aware of the network in particular.

Consequently, all the functions can be used over the network, including ones that are currently not network-compatible.

The present invention also avoids the foregoing problems by a single main unit managing the slots of all the main units connected to the network in an integrated fashion.

More specifically, a master main unit for controlling all the call processing on the network manages both its own slots and the slots of slave main units that are connected thereto in an integrated fashion, thereby handling the slots of the other systems as if they are the slots of the own system.

This makes it possible for the master to manage all the information on the slots on the network and to handle all the resources, including the terminals and lines connected to packages that are installed in the slots, as if they belong to the own system.

In an aspect of the present invention, there is provided a slot interface access unit including a slot management module, a slot control module, and a physical slot/managed slot comparison table which are provided between an input/output control module and a slot interface subordinate thereto, wherein: the input/output control module accesses the slot interface by using virtual slot identification information; and the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface.

In another aspect of the present invention, there is provided a slot interface access method, including a slot management module, a slot control module, and a physical slot/managed slot comparison table between an input/output control module and a slot interface subordinate thereto, wherein: the input/output control module accesses the slot interface by using virtual slot identification information; and the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface.

In another aspect of the present invention, there is provided a redundancy configuration of a main unit, including a plurality of main units, one of the main units being a master main unit, the other main units being slave main units, wherein, when the master main unit ceases to function properly, one of the slave main units becomes a new master main unit.

Further, according to the present invention, the foregoing redundancy configuration of a main unit is such that: the new master main unit monitors whether the dysfunctional master main unit is recovered; and when the dysfunctional master main unit is recovered, the new master main unit returns control right on the entire system to the master main unit recovered.

In another aspect of the present invention, there is provided a replacing method of a main unit, including a plurality of main units, one of the main units being a master main unit, the other main units being slave main units, wherein, when the master main unit ceases to function properly, one of the slave main units becomes a new master main unit.

Further, according to the present invention, the foregoing replacing method of a main unit is such that: the new master main unit monitors whether the dysfunctional master main unit is recovered; and when the dysfunctional master main unit is recovered, the new master main unit returns control right on the entire system to the master main unit recovered.

In another aspect of the present invention, there is provided a slot interface access unit including a slot management module, a slot control module, and a physical slot/managed slot comparison table which are provided between an input/output control module and a slot interface subordinate thereto, wherein: the input/output control module accesses the slot interface by using virtual slot identification information; the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface; and the slot interface access unit has a CPU power higher than that of other units having a slot interface.

In another aspect of the present invention, there is provided an accessing method of a slot interface, including a slot management module, a slot control module, and a physical slot/managed slot comparison table between an input/output control module and a slot interface subordinate thereto, wherein: the input/output control module accesses the slot interface by using virtual slot identification information; the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface; and the method is performed by a unit having a CPU power higher than that of other units having a slot interface.

According to the present invention, it is theoretically possible to use all the functions of the main units over the network. In existing technologies, the main units have been operated basically independently of each other. For cooperation of the main units, it has been necessary to make special modifications to the respective functions. In contrast, the present invention introduces the mechanism for absorbing differences between networks in a lower layer, whereby the functions of upper layers can be executed without being aware of the networks.

The present invention can also be used to achieve networking of higher reliability. In conventional methods, the main units have been operated independently and their resources have been managed separately. An inconsistency therefore might have occurred between the states of resources and the like depending on timing. The present invention can also solve this problem.

The present invention is to construct functions in the lowermost layers of the functions of the main units. This prevents functional troubles in the upper layers as long as the lower layers are fabricated satisfactorily. The centralized resource management also prevents an inconsistency between the states of resources etc.

The present invention can also be used to construct a mechanism of networking without making aware of.

By introducing of the mechanism for absorbing differences between networks in a lower layer, applications in upper layers can use the functions without being aware of the networks.

This completely eliminates the need for network support processing which has heretofore been necessary in the application level, thereby allowing not only a significant reduction in the man-hours for supporting networks but also an improvement of the communication quality.

Consequently, it is possible to reduce thousands of man-hours that have conventionally been necessary to modify the functions so as to be network-compatible, and improve the communication quality as well.

BRIEF DESCRIPTION OF THE DRAWINGS

FIG. 8 is a diagram showing a concrete example of the physical slot/virtual slot comparison table according to the embodiment of the present invention;

DETAILED DESCRIPTION OF THE PREFERRED EMBODIMENTS

Hereinafter, preferred embodiments for carrying out the present invention will be described in detail with reference to the drawings.

First Embodiment

The point of the present embodiment consists in the technique of handling resources on a network as if they are own resources.

Running under program control, main units perform resource management on hardware, i.e., management on terminals, lines, and the like in the form of package management.

Figure 1:
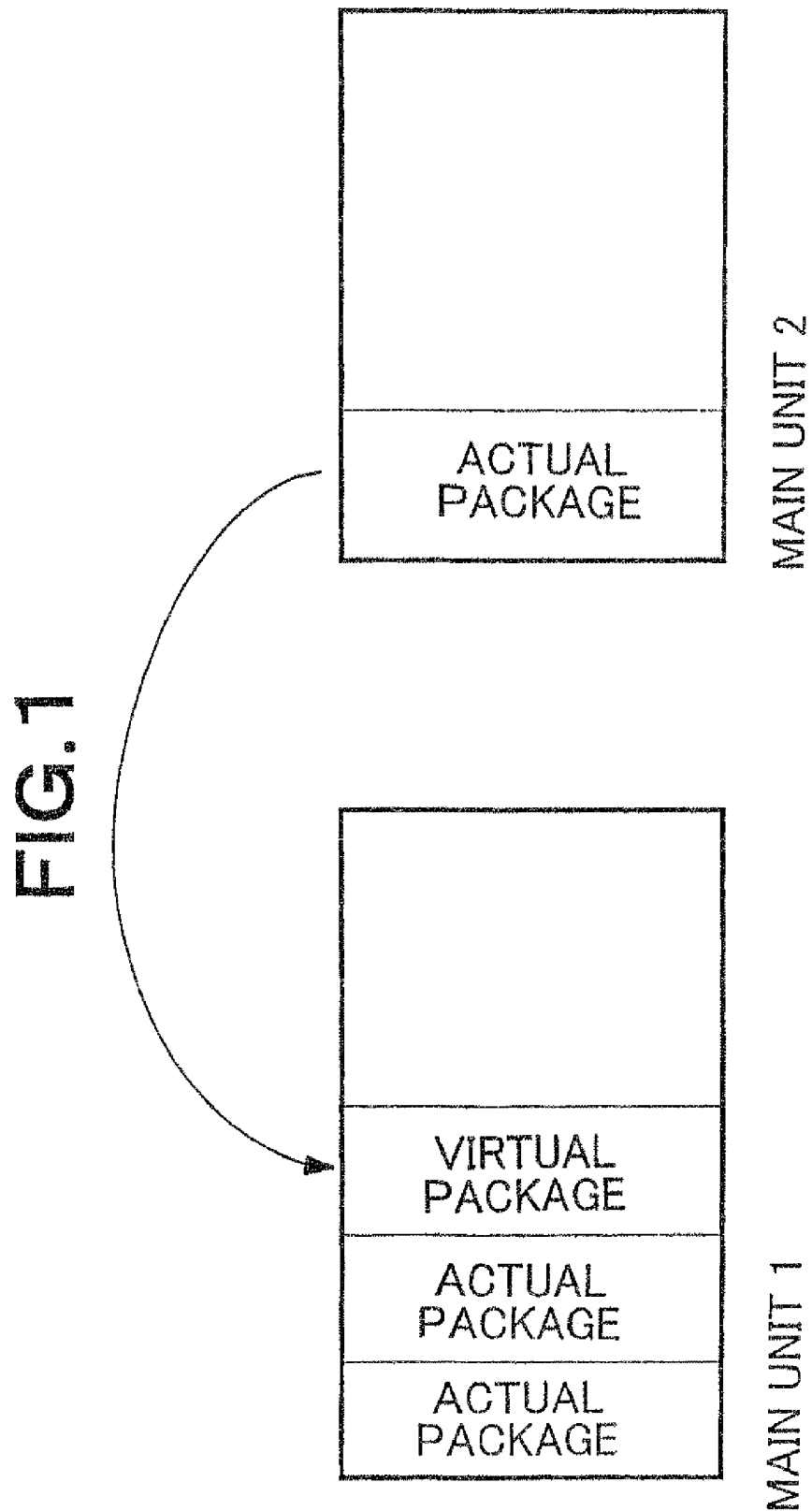
FIG. 1 is a diagram showing how an actual package in another main unit is handled as an actual package in the own apparatus by using a virtual package according to an embodiment of the present invention.

To handle resources on a network as if they are own resources, it is therefore only necessary that packages on the network can be handled as if they are own packages FIG. 1 shows a conceptual diagram of package management over a network.

When a package is installed in a main unit 2, information on the package and information on terminals, lines, and the like connected thereto are transmitted to a main unit 1 via Ethernet™.

Since none of the information is transmitted to a package control part or a call control part of the main unit 2, it seems to the main unit 2 that the situation has not changed at all.

The main unit 1 processes upstream data from the main unit 2 in its lower layer as if the information comes upstream from one of its own slots. It thus seems to the main unit 1 that the package is plugged in one of its own slots.

Instructions to the packages (downstream data) are also processed in the lower layer. Instructions to the virtual package are transmitted to the actual package on the network.

The introduction of the foregoing mechanism makes it possible to handle resources on the network as if they are own resources.

Consequently, upper layers including call control can use the resources freely without being aware of the network.

Figure 2:
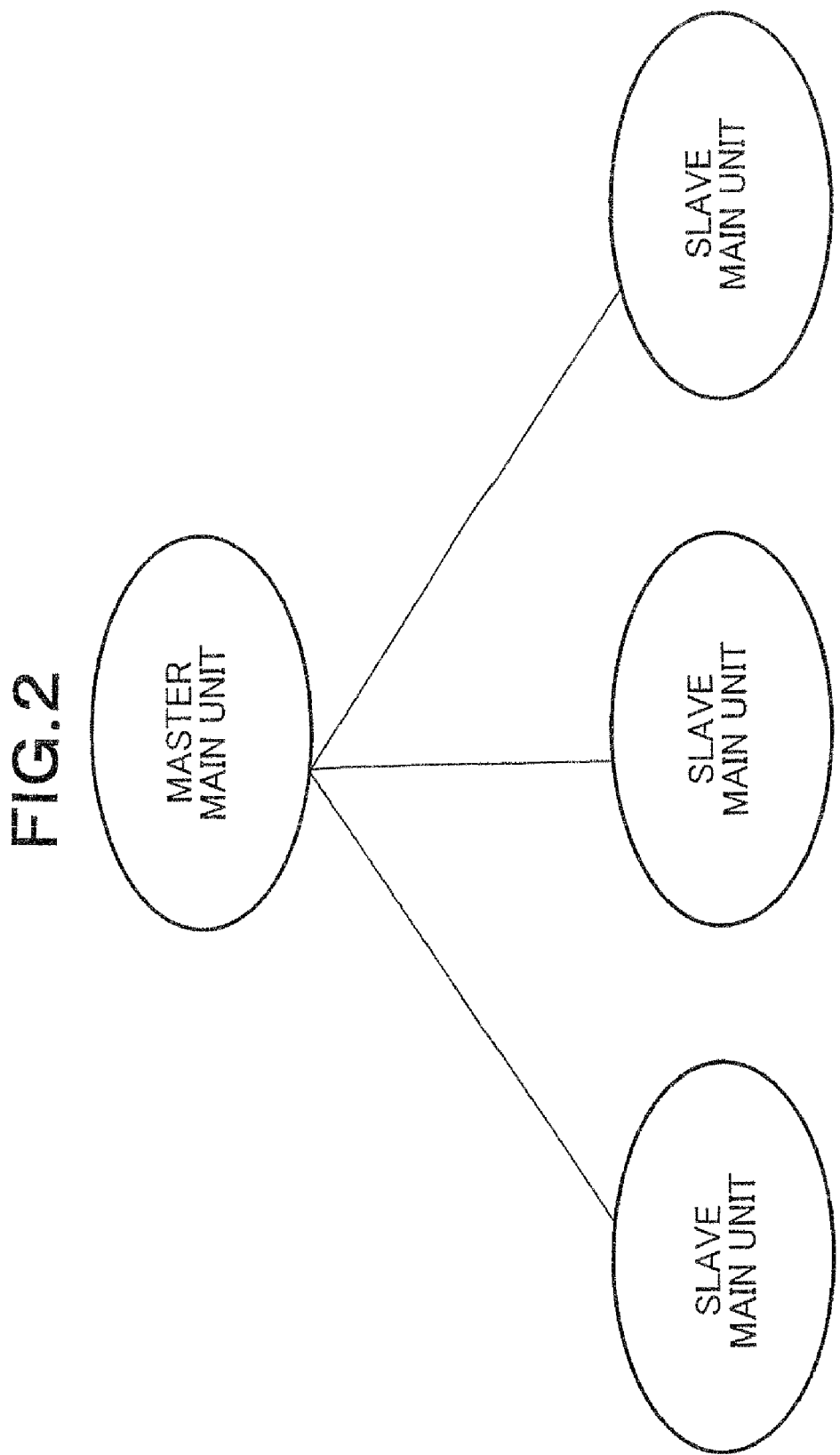
FIG. 2 is a diagram showing an example of connection of a master main unit and slave main units according to the embodiment of the present invention.

FIG. 2 shows a block diagram of the networking according to the present invention.

A main unit that manages all the resources on the network and performs all the call control will be referred to as master.

Main units that are connected to the master, provide package information, and follow instructions from the master will be referred to as slaves.

The networking according to the present embodiment requires that one of the plurality of main units constituting the network serve as a master. All the slaves are connected to the master and follow instructions from the same, performing none of such processing as call control by themselves. That is, the slaves inactivate their functional parts for performing call control and the like if any.

The master can control the plurality of slaves, and can handle all the resources of the main units that are connected as slaves, as if they are its own resources.

Consequently, the network composed of the master and the slaves can operate as if it is a single system.

Information about which of the main units to serve as a master and which slave, and information about what IP addresses the main units are connected with, must be set in advance.

The main unit that is set as the master waits for connections from the slaves. The slaves connect to the IP address of the master which is set in advance.

After the connections between the master and the slaves are thus established, transmission of package information and the like are performed and the network starts to operate.

Now, if the master goes down by any chance, all the main units connected thereto may become inaccessible. To avoid this, when the master goes down, one of the one or more slaves becomes as a new master to play the role of the master instead (Redundancy).

Information about which of the slaves to operate for the master that goes down must set in advance.

Next, description will be given of a concrete method for performing centralized management on resources on a network.

Figure 3:
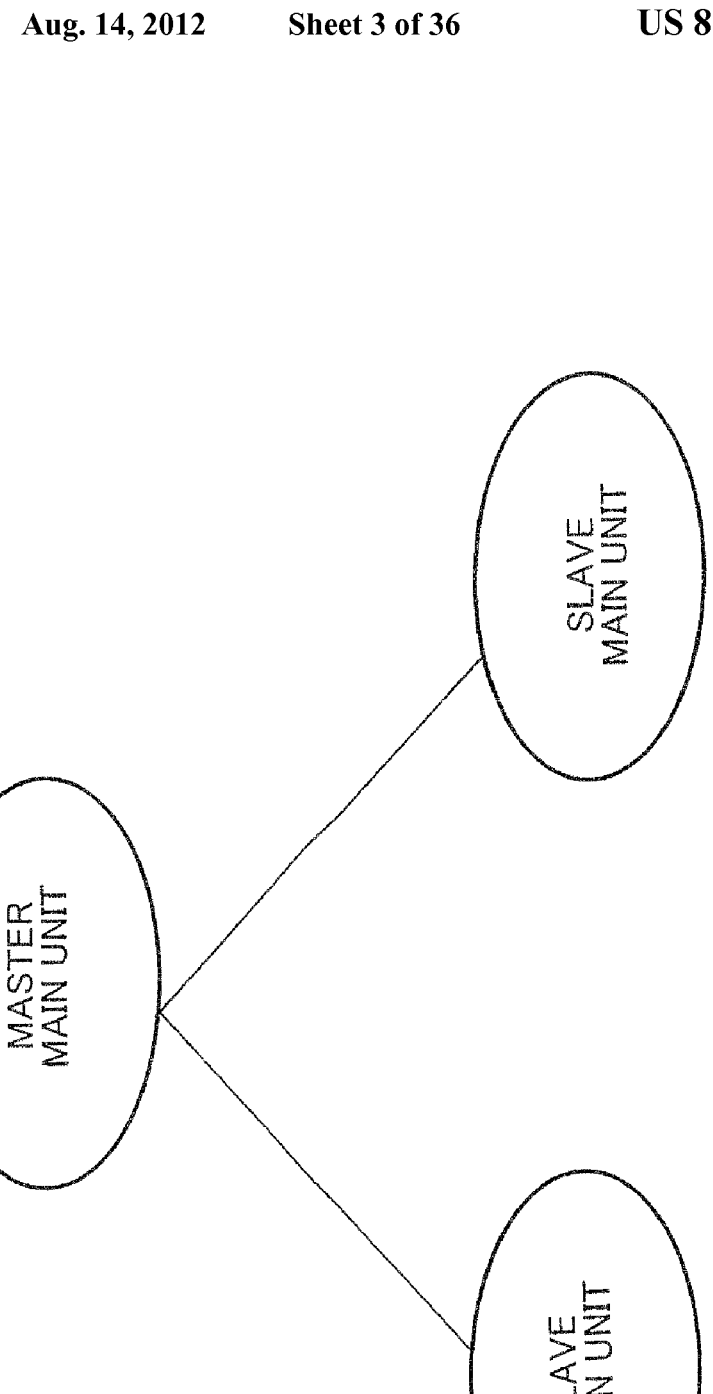
FIG. 3 is a diagram showing another example of connection of a master main unit and slave main units according to the embodiment of the present invention.

FIG. 3 shows a system configuration for networking.

A network includes only one master, which controls all slaves.

To identify each system on the network, the systems have respective unique values called system IDs.

Figure 4:
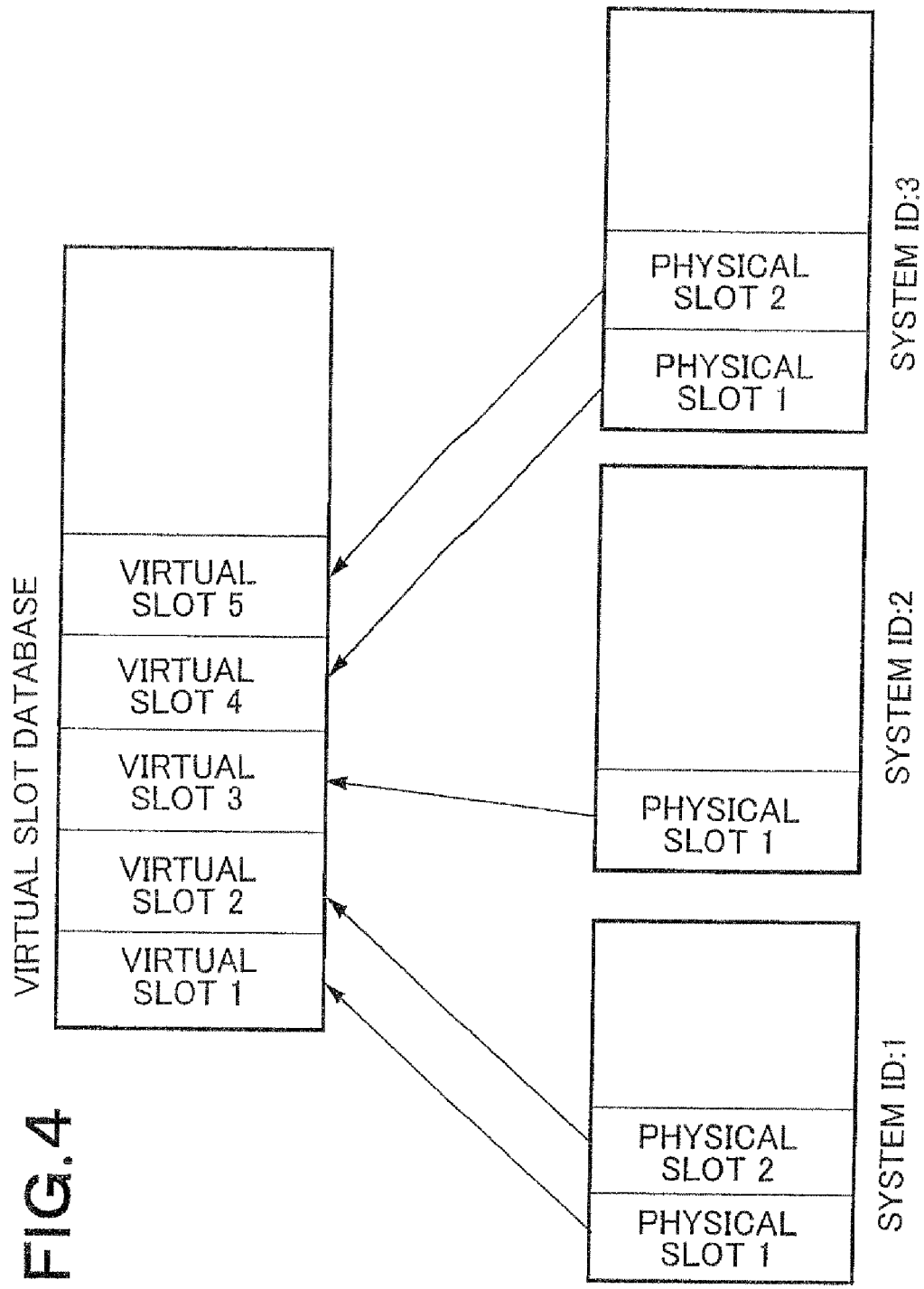
FIG. 4 is a diagram showing correspondence between virtual slots and physical slots according to the embodiment of the present invention.

FIG. 4 shows a conceptual diagram of slot management according to the present invention.

In each of the network-connected systems having respective systems ID, packages are physically installed in slots. The information on these slots is integrated into a virtual slot database and managed by the master system.

The master controls the slots with reference to this virtual slot database.

To the master, physical slots corresponding to the slots of the other systems are present at remote locations connected by the IP network. The master can handle those slots, however, as if they are its own slots without being aware of the physical slots at the remote locations.

The master can thus handle terminals and lines that are connected to the packages installed in those slots as if they are terminals and lines connected to the own system.

Figure 5:
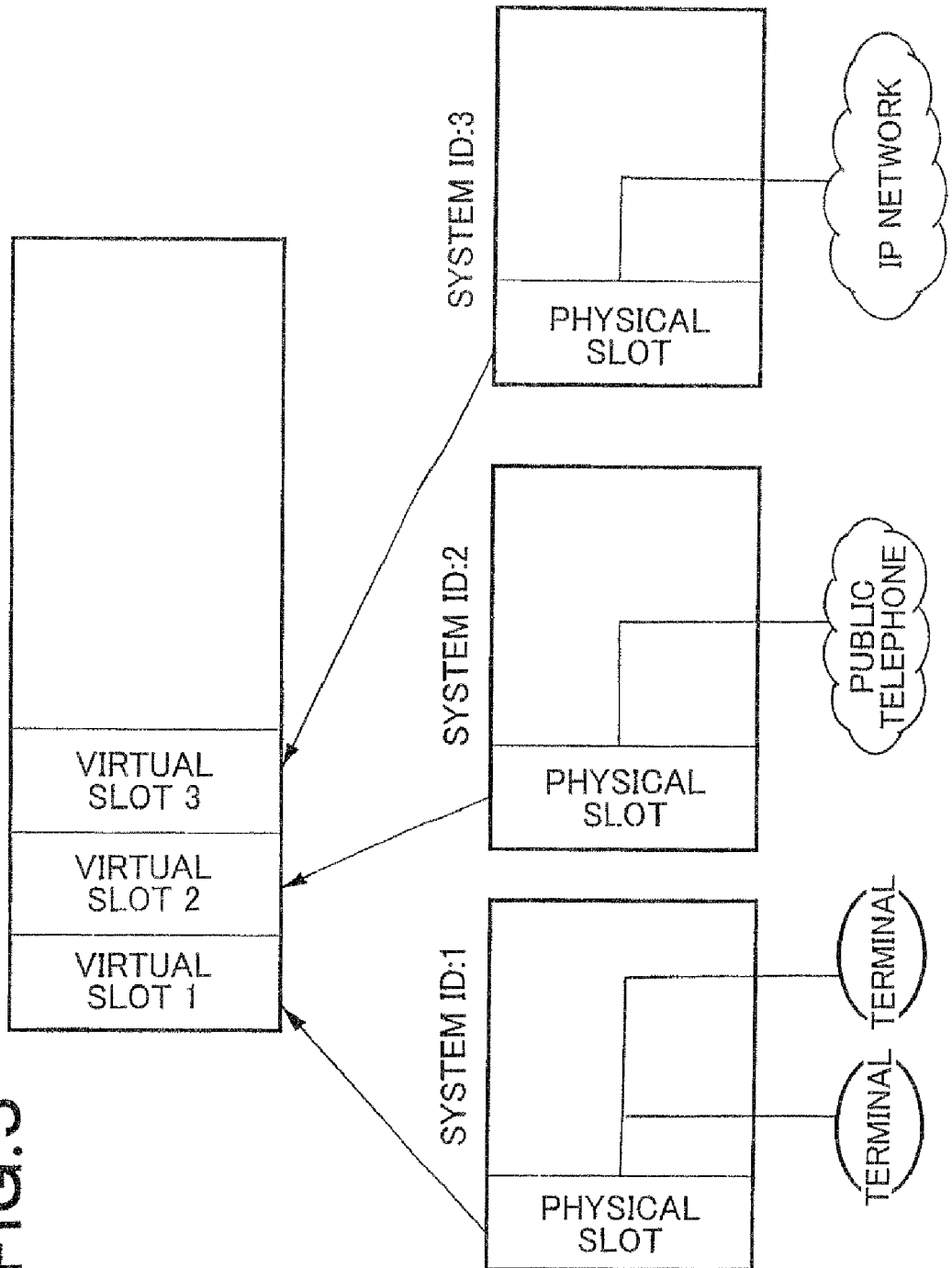
FIG. 5 is a diagram showing correspondence between virtual slots and physical slots, and examples of connections of the respective physical slots according to the embodiment of the present invention.

This is depicted in FIG. 5.

A package for connecting terminals is installed in the system having system ID: 1. A package for accommodating lines connected to a public line is installed in the system having system ID: 2. A package for accommodating IP lines connected to an IP network is installed in the system having system ID: 3.

Since these physical slots are managed as virtual slots, the terminals, lines, and the like accommodated by the packages in connection with the slots can be controlled freely as with the own system.

By the foregoing method, the functions of the main units can be used without limitations even when the systems are distributed over the network.

The systems shown in FIG. 5 are in the server-client configuration where one master controls the remaining slaves as shown in FIG. 3. The master performs call processing and database management on all the main units, including its own system. The virtual slots are also managed by the master.

The systems are IP-connected and have respective unique system IDs for identifying the systems.

The system 1 accommodates the package for accommodating terminals, the system 2 the package for accommodating subscriber lines, and the system 3 the package for accommodating IP lines.

The information thereon is managed in the virtual slot database. This data is basically managed by the master, whereas each slave retains the same data in case the master is changed.

The embodiment shown in FIG. 5 will be described in terms of data flow.

Figure 6:
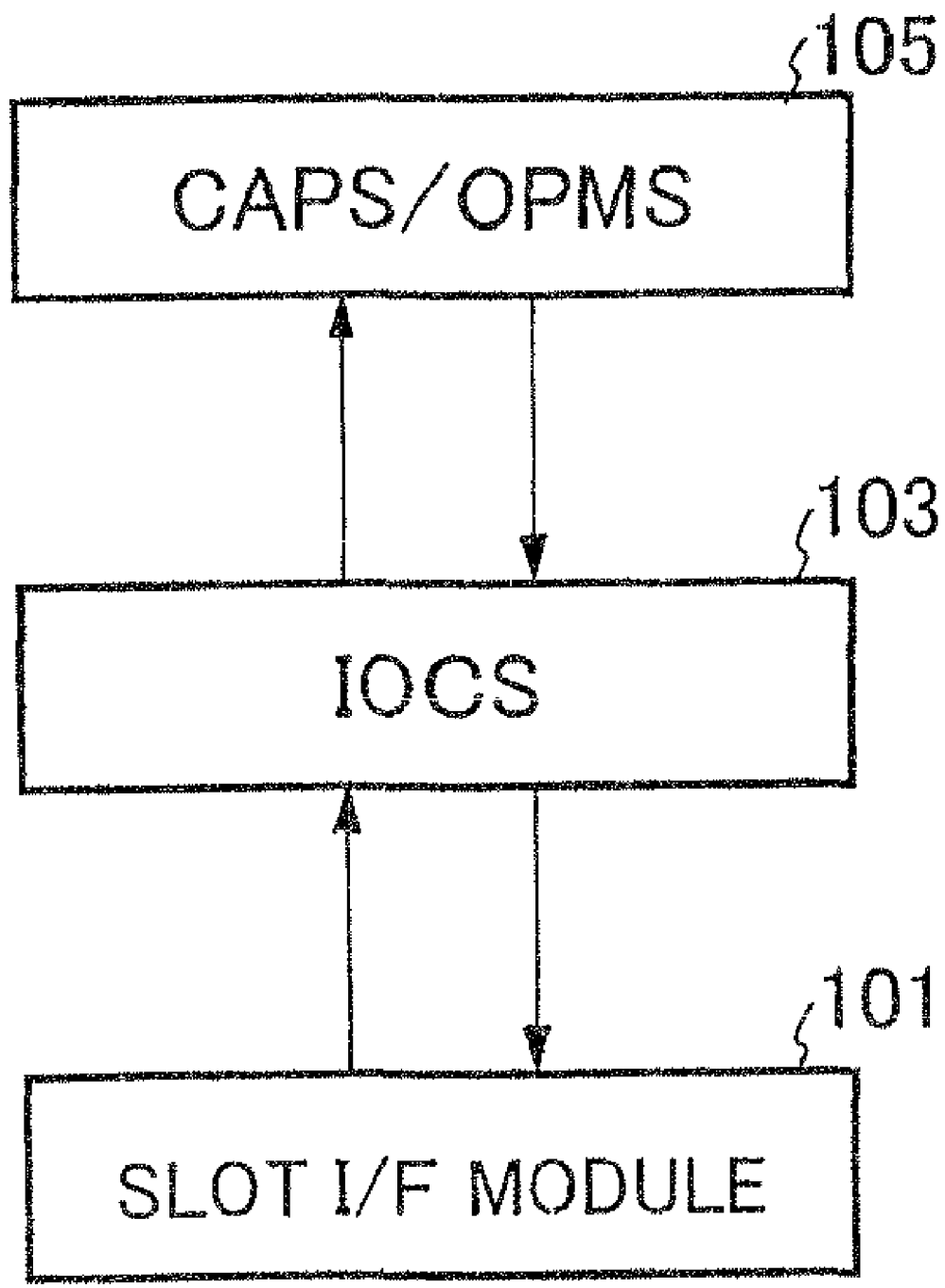
FIG. 6 is a diagram showing connections between CAPS/OPMS, IOCS, and a slot interface according to a conventional example.

FIG. 6 shows the flow of data for conventional package control.

As shown in FIG. 6, upstream data from a package is transmitted from a slot I/F module 101 to a CAPS (call control module)/OPMS (package and terminal management module) 105 through an IOCS (input/output control module) 103.

The data is then processed by the CAPS/OPMS 105, and an instruction is given downstream to the slot I/F module 101 through the IOCS 103. For example, when a package is installed, upstream data is transmitted to the OPMS 105. The OPMS 105 recognizes the installation of the package, and permits the activation of the package for package activation control. For another example, when a terminal connected to a package that is installed in the slot is off-hook, upstream data is transmitted to the CAPS 105 to notify about the off-hook. Receiving this, the CAPS 105 sends a command for generating the dial tone to the terminal through the IOCS 103 as downstream data.

In FIG. 6, the data from the slot I/F module 101 is directly delivered to the upper modules. This naturally allows control only on slots that are connected to the own system.

Figure 7:
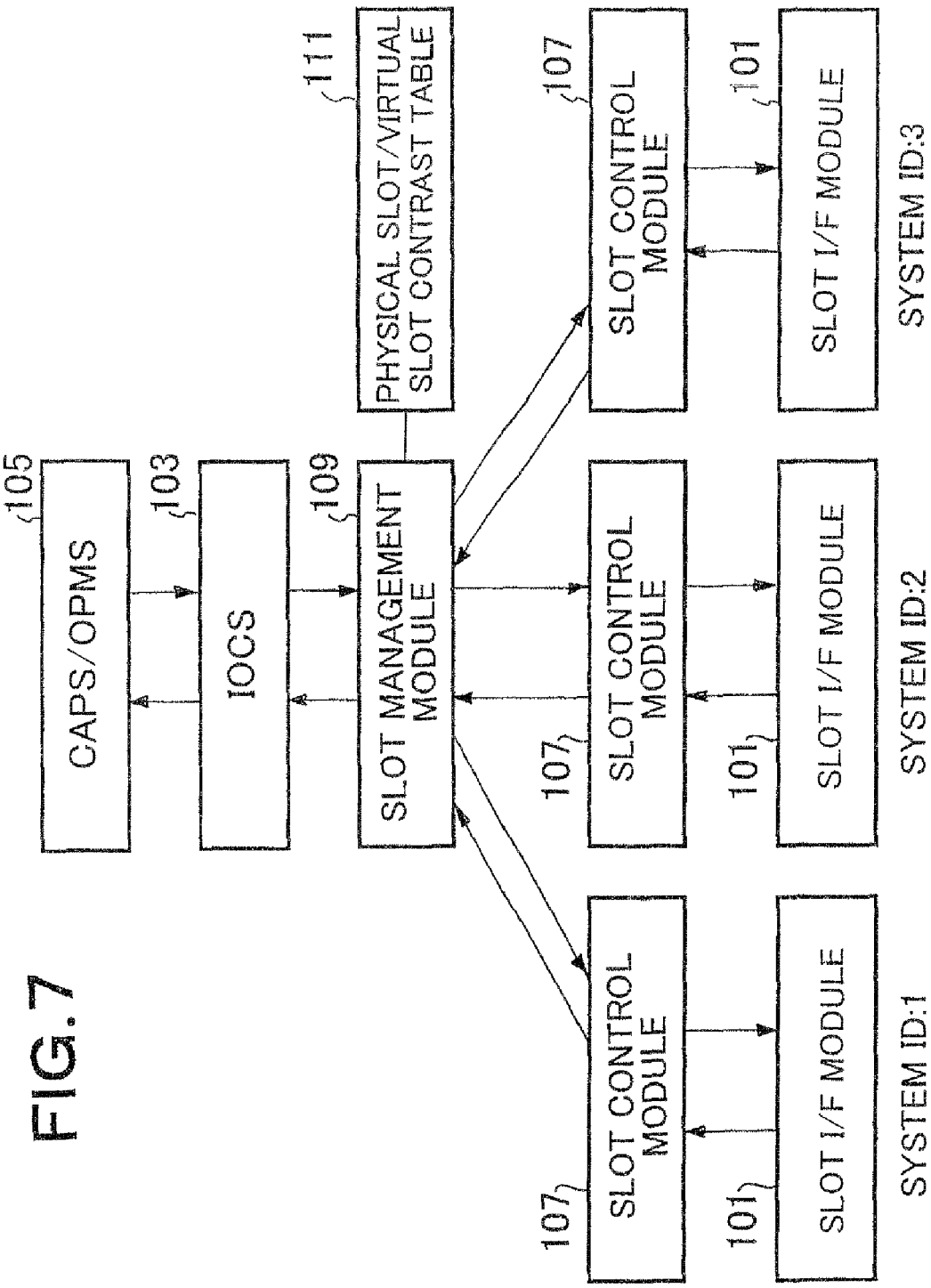
FIG. 7 is a diagram showing connections between CAPS/OPMS, IOCS, slot management modules, a physical slot/virtual slot comparison table, slot control modules, and slot interfaces according to the embodiment of the present invention.

FIG. 7 shows the flow of data according to the present embodiment.

As shown in FIG. 7, slot control modules 107 for controlling slot inputs/outputs and a slot management module 109 for managing slot information are newly added to realize slot management over the network.

Upstream data from a slot is once spooled in a slot control module 107 before transmitted to the slot management module 109 of the master to which the own system belongs. If the own unit is the master, upstream data is transmitted to its own slot management module 109. The data transmitted to the slot management module 109 is presented to the IOCS 103, an upper module, as if the data comes upstream from a certain slot.

Now, the operation of the slot management module 109 will be described with reference to FIG. 8.

Suppose that the slot management module 109 receives data from a certain slot of a certain system. If the slot of the system is yet to be recognized, a new virtual slot number is assigned thereto, and the slot of the system will subsequently be handled as a slot that has the assigned virtual slot number.

For example, if upstream data comes from slot 1 of the system 1 and the slot is yet to be recognized, then a virtual slot 1 is assigned thereto.

When a new virtual slot is assigned thus, a physical slot/virtual slot comparison table 111 is created as shown in FIG. 8.

Upstream data from the slot 1 of the system 1 will subsequently be handled by the upper modules such as IOCS and CAPS as if from a slot 1 of the own system. This even eliminates the need to be aware of the network.

When transmitting downstream data to slots and issuing instructions to hardware actually, the physical slot/virtual slot comparison table 111 is referred to so that the instructions are given to the slots of the appropriate systems.

The instructions are also delivered to the slot control modules 107 of the respective systems, whereby commands are transmitted to the actual packages of the systems.

As described above, the introduction of the module for controlling and managing slots on the network eliminates the need for most of the processing of the main units to take account of the network, so that the master can control the hardware as if it controls its own system.

Unlike physical slots, virtual slots do not have a hardware limit in number, and may be assigned infinitely as far as the system memory permits.

The processing inside the systems is usually carried out with virtual slot numbers. It is sometimes desired to identify which slot of which system is being processed, however, in situations visible to users like when setting system data.

In such situations, the physical slot/virtual slot comparison table 111 can be referred to perform the setting and the like in terms of physical slots.

Second Embodiment

The first embodiment has solved most of the conventional problems by inventing a method of networking of centralized management system to avoid problems in distributed networking systems.

This in turn entails the drawback of system vulnerability, however. More specifically, in the first embodiment, the one main unit to be the master (hereinafter, referred to as "master main unit") manages all the resources on the network in a centralized fashion, and controls all the main units to be slaves (hereinafter, referred to as "slave main units"). There has thus been the problem that when the master main unit ceases to function properly by any fault, all the slave main units connected thereto also become inoperable and the entire network goes down.

The second embodiment is an improvement of the first embodiment, and it is an object thereof to provide redundancy to the networking system, thereby increasing the robustness of the entire system against failures such as a malfunction of the network.

In the second embodiment, when the main unit to be the master main unit ceases to function properly, an alternative main unit is selected from among the slave main units connected thereto. This alternative main unit then operates as the master main unit, thereby avoiding the above-mentioned problem.

More specifically, when the master main unit ceases to function properly, it is detected by the slave main units connected thereto. A main unit to be the alternative is selected from among all the slave main units according to the order of priorities set in advance. The slave main unit to be the alternative master main unit then starts to operate as the master main unit, controlling all the slave main units. The introduction of this mechanism can prevent the entire network from going down and make it continue to operate for improved system robustness even when the master main unit ceases to function properly.

In the second embodiment, when the master main unit system ceases to function properly in the networking of centralized management system, an alternative master main unit is uniquely selected based on the priorities set for the respective main units in advance. The functions of the master main unit are taken over to the main unit selected.

Figure 9:
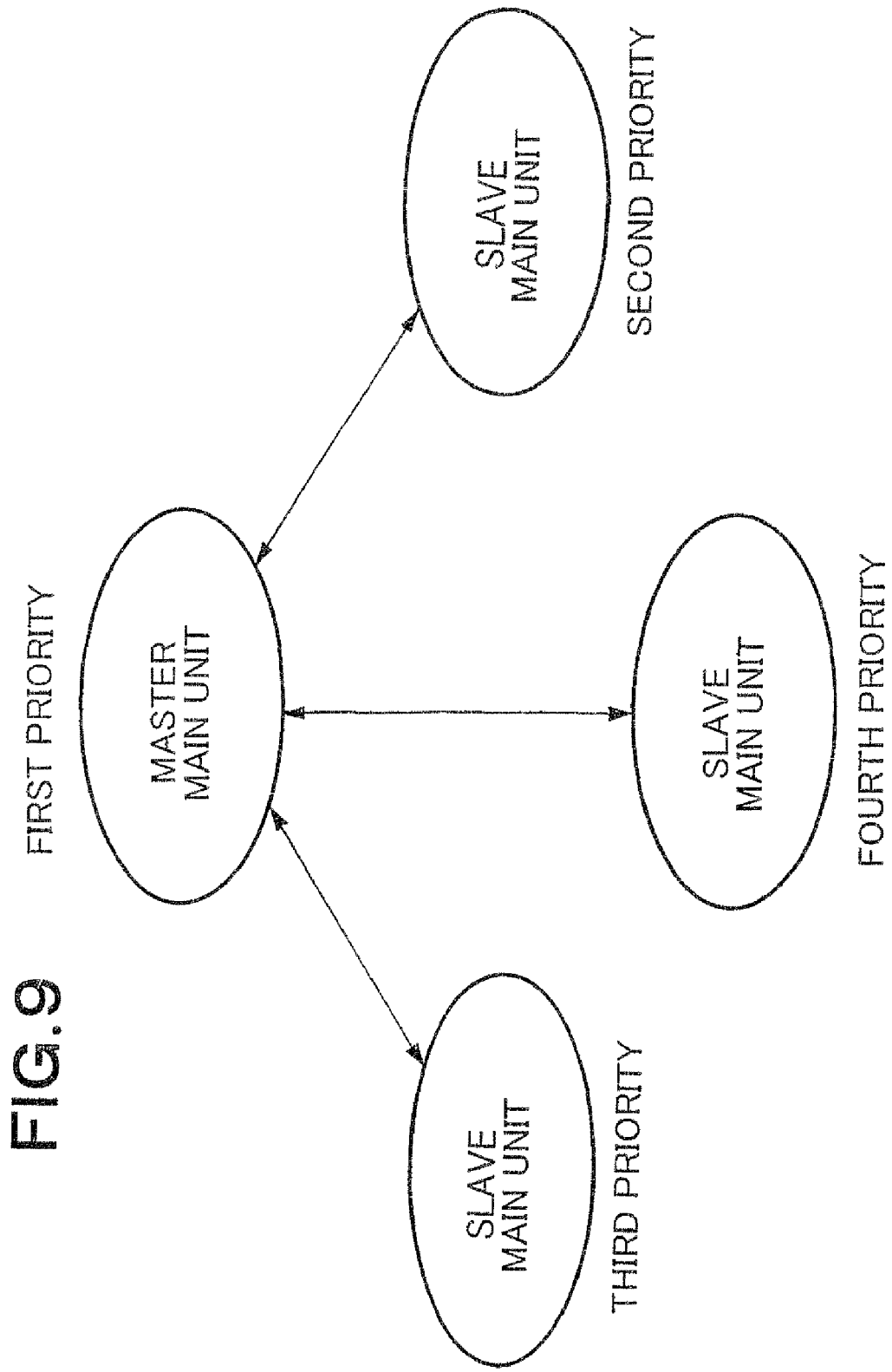
FIG. 9 is a first diagram showing connections between a master main unit and slave main units according to a second embodiment of the present invention.
Figure 10:
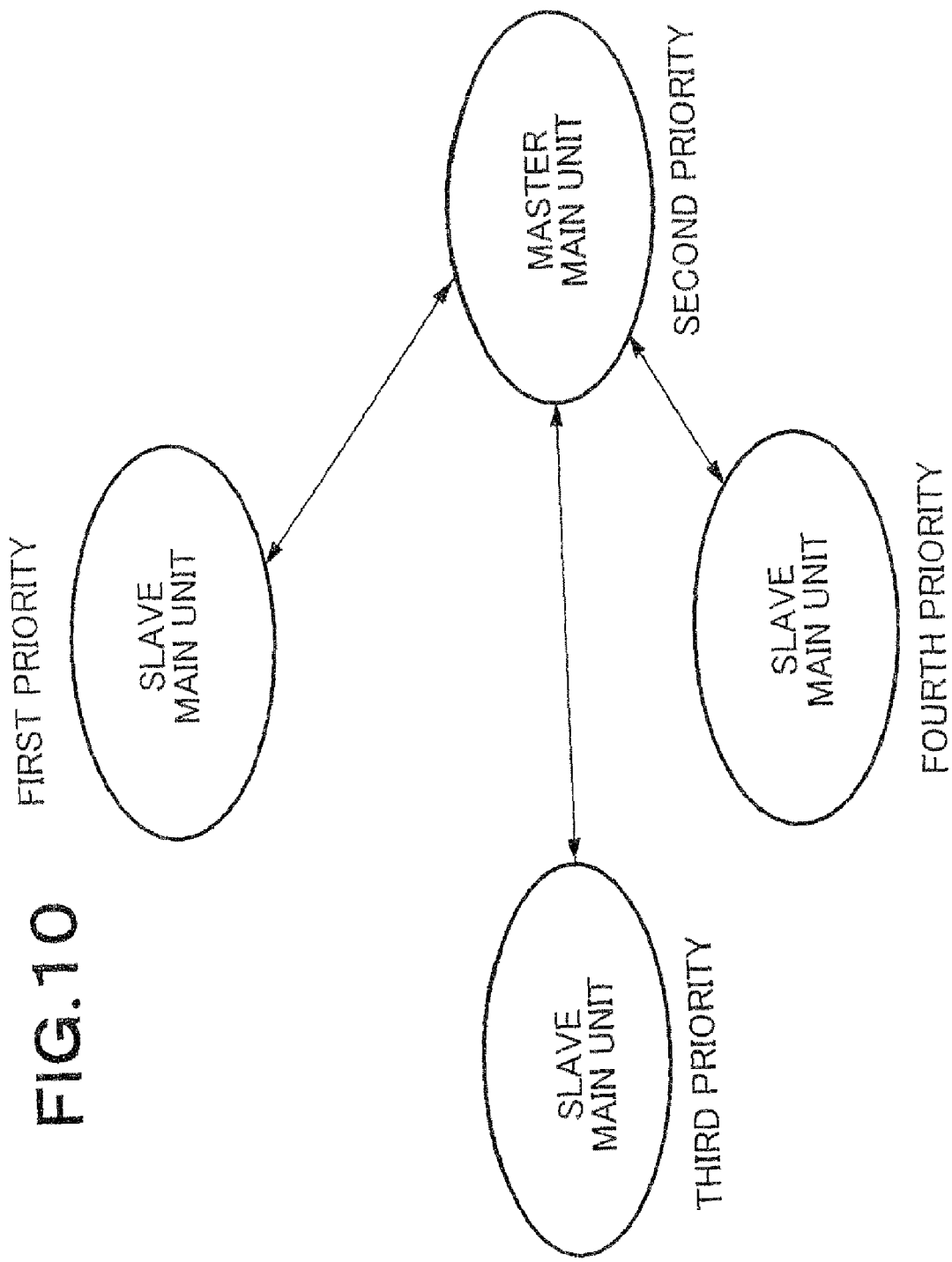
FIG. 10 is a second diagram showing connections between a master main unit and slave main units according to the second embodiment of the present invention.

FIGS. 9 and 10 show conceptual diagrams of the present invention.

The arrows indicate respective communication relationships, that two-way communications are maintained between the master main unit and the respective slave main units.

When the master main unit ceases to function properly or when its communication is interrupted by such reasons as a network failure, the master main unit is replaced, shifting from the state of FIG. 9 to the state of FIG. 10.

The ellipses in FIGS. 9 and 10 represent main units. The main units contain system data on their respective master main unit priorities. When a failure occurs, the main unit having the highest master main unit priority is selected to operate as a master main unit from among the main units in service. All the main units contain each other's IP addresses.

Each of the slave main units always monitors the connection with the master main unit. When the communication with the master main unit cannot be performed over a certain period of time, the selection of an alternative master main unit is started, considering that the master main unit might have ceased to function properly or a network failure might have occurred.

An alternative master main unit is selected by each main unit inquiring the priorities of all the main units other than itself. The inquiry is made by casting a certain IP packet to a list of the other main units (expressed in IP addresses) each main unit has.

Receiving this packet, the main units return their own priorities.

Figure 11:
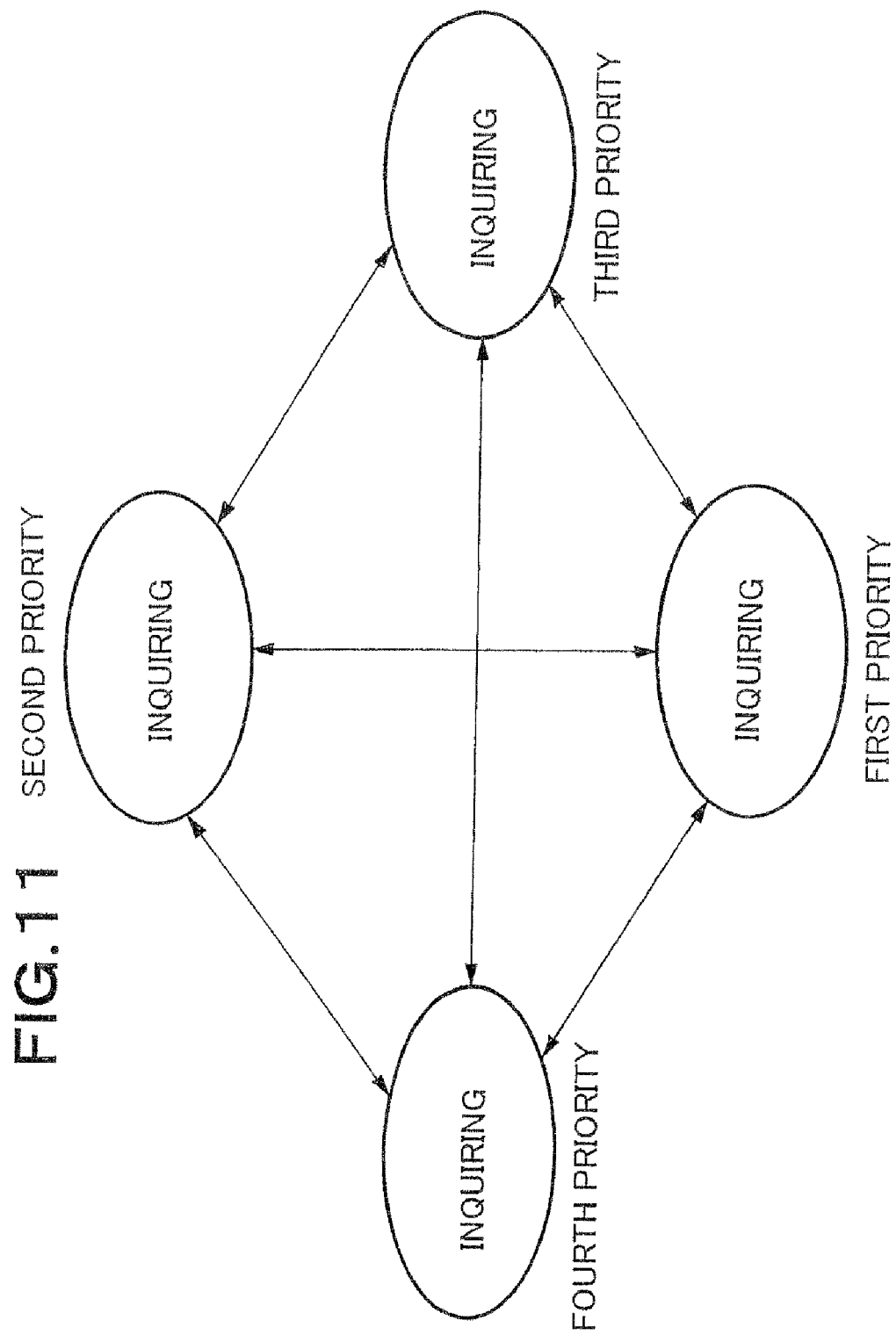
FIG. 11 is a diagram showing how priority inquiries are made between the main units according to the second embodiment of the present invention.

FIG. 11 shows a conceptual diagram of the priority inquiry.

Each ellipse represents a main unit that is making an inquiry for priorities. The arrows indicate inquiries being made. As shown in the diagram, the priorities are inquired in a round robin fashion.

If a main unit receives responses from all the main units in its own list and finds that its own priority is the highest, it starts to operate as a master main unit. Main units from which no response comes within a certain time are considered to be inoperable, and a master main unit is determined from among ones having responded.

For subsequent inquiries, the main unit that has determined itself to be a master main unit returns the notification that it is the master main unit.

Meanwhile, the main units of lower priorities continue making inquiries until the main unit of the highest priority becomes the master main unit As inquiries continue, the main unit to be the master main unit starts to operate, and the new master main unit returns the notification of being the master main unit in response to the inquiries. Receiving this response, the main units of lower priorities then connect to the responding master main unit, starting to operate as slave main units themselves.

The foregoing flow lasts until each main unit makes itself a master main unit or a slave main unit. The repetition of this flow makes it possible to select a master main unit of the highest priority uniquely, and create a new network with respect to the selected master main unit.

The main units are connected with an IP network, and have respective unique IP addresses and unique values of master main unit candidate priorities. The main units also have a list of IP addresses of all the other main units that constitute the network. For the purpose of identification, the main units also have respective unique IDs. Hereinafter, these IDs will be referred to as system IDs. The system IDs may be regarded as equivalent to the master main unit priorities.

Figure 12:
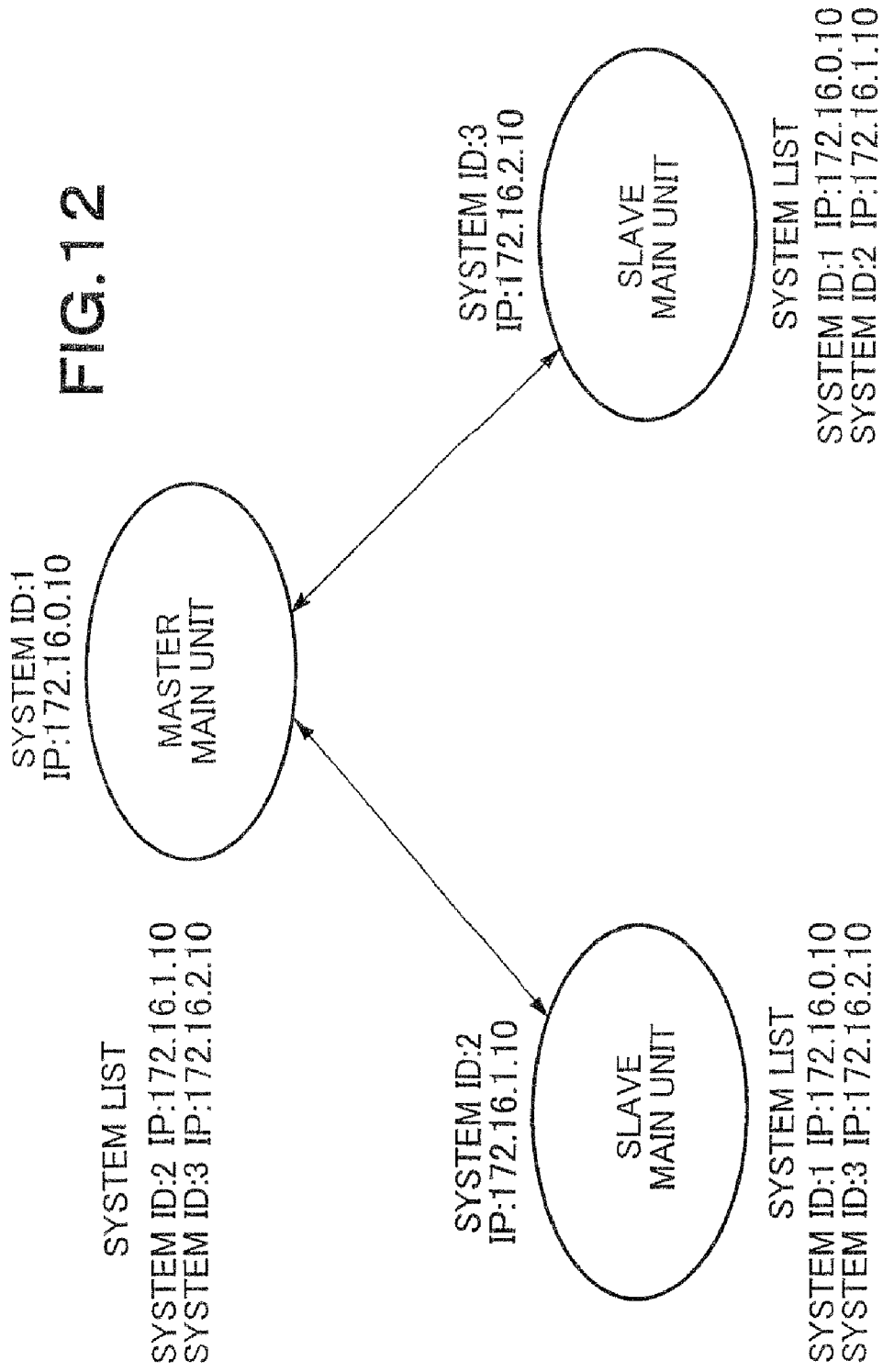
FIG. 12 is a third diagram showing connections between a master main unit and slave main units according to the second embodiment of the present invention.

FIG. 12 shows a block diagram of the present invention.

As shown in FIG. 12, the main units have respective unique IP addresses and unique system IDs, and contain data on information as to the IP addresses and system IDs of the other main units.

When the master main unit ceases to function properly, when the network is being constructed, and when the master main unit is yet to be determined, the information is referred to determine the master main unit.

By this method, an alternative master main unit can be selected to continue minimum network operations. This method by itself is not sufficient, however, to provide operations without impairing functions. A method for compensating this will be described below.

1. Synchronization of System Data

The main units retain configuration information on telephone sets, lines, and the like in the form of a file called system data.

In the networking of centralized management system, the master main unit manages and operates information on all the slave main units. The master main unit therefore refers to the system data retained in the master main unit.

When the master main unit is changed, the main unit serving as the new master main unit is to refer to system data in its own main unit. The main units that have the possibility to serve as the master main unit therefore need to contain the same system data as that of the system that is currently running as the master main unit.

To achieve this, the networking of centralized management system incorporates the mechanism of transmitting the latest system data to its subordinate slave main units for synchronization each time the master main unit updates the system data.

2. Forced Switching of Master Main Units

In the foregoing method of changing the master main unit, the master main unit is changed automatically when connection cannot be performed with the master main unit over a certain period of time, considering that a failure has occurred in the master main unit. It is sometimes desired to reset the master main unit to the original master main unit, however, at the time of resetting for such reasons as system customization.

Moreover, when initially constructing a network system, it depends on the order of activation which of the main units becomes the master main unit. This is disadvantageous if a certain main unit is desired to be the master main unit.

For such situations, there is provided the function of forcefully setting the master main unit.

The forceful setting of the master main unit is manually performed by the user, by specifying the system ID of the main unit that is desired to be the master main unit. For example, when a certain number (such as #999) plus a system ID are pressed from a certain telephone terminal, the main unit having that system ID is forcefully set as the master main unit.

This operation may be made from a terminal of any of the systems connected to the network.

Upon this operation, the master main unit can determine what system ID the new master main unit has. The master main unit therefore acquires the IP address of the new master main unit from its own list of IP addresses, and sends a command packet to that main unit, commanding to be the master main unit.

The main unit that receives this command starts to operate as the master main unit, and notifies all the main units that the master main unit is changed.

The second Embodiment can avoid the conventional problem of vulnerability in the networking of centralized management system, that the entire network becomes inoperable when the main unit serving as the master ceases to function properly.

This function is particularly significant and is even indispensable for systems that may be used for mission-critical services such as a telephone set.

Third Embodiment

The second embodiment has provided the redundancy function to the networking of centralized resource management system, whereby the master main unit for controlling the entire network can be switched for improved system robustness.

The second embodiment, however, entails the problem that the switching of the master main unit can change the destinations of communication of such communication terminals as an external CTI (Computer Telephony Integration) server and ACD-MIS (Automatic Call Distributor-Management Information System), making the communications no longer possible. The communication terminals such as an external CTI server and ACD-MIS also require information beforehand about which of the main units on the network is the master main unit.

In the third embodiment, the main units other the master main unit transfer (redirect) communications from such communication terminals as a CTI server and a ACD-MIS to the master main unit, thereby avoiding the above problem.

More specifically, when a main unit recognizes a connection from a communication terminal, it redirects the connection from the communication terminal to the master main unit to which it is connected if the main unit itself is not the master main unit, i.e., if it is a slave main unit. The main unit also transfers data from the communication terminal, and relays data from the master main unit to the communication terminal.

Consequently, it seems to the communication terminal that the communication is performed with the master main unit, and to the master main unit that the communication is performed with the communication terminal.

This eliminates the need for the communication terminal to be aware of the switching of the master main unit, and the need to be aware of which of the main units on the network is the master main unit.

Even to the master main unit, it seems that the communication is performed with the communication terminal as heretofore. No particular change is thus required for the processing.

Now, the third embodiment will be described in more detail with reference to the drawings.

Figure 13:
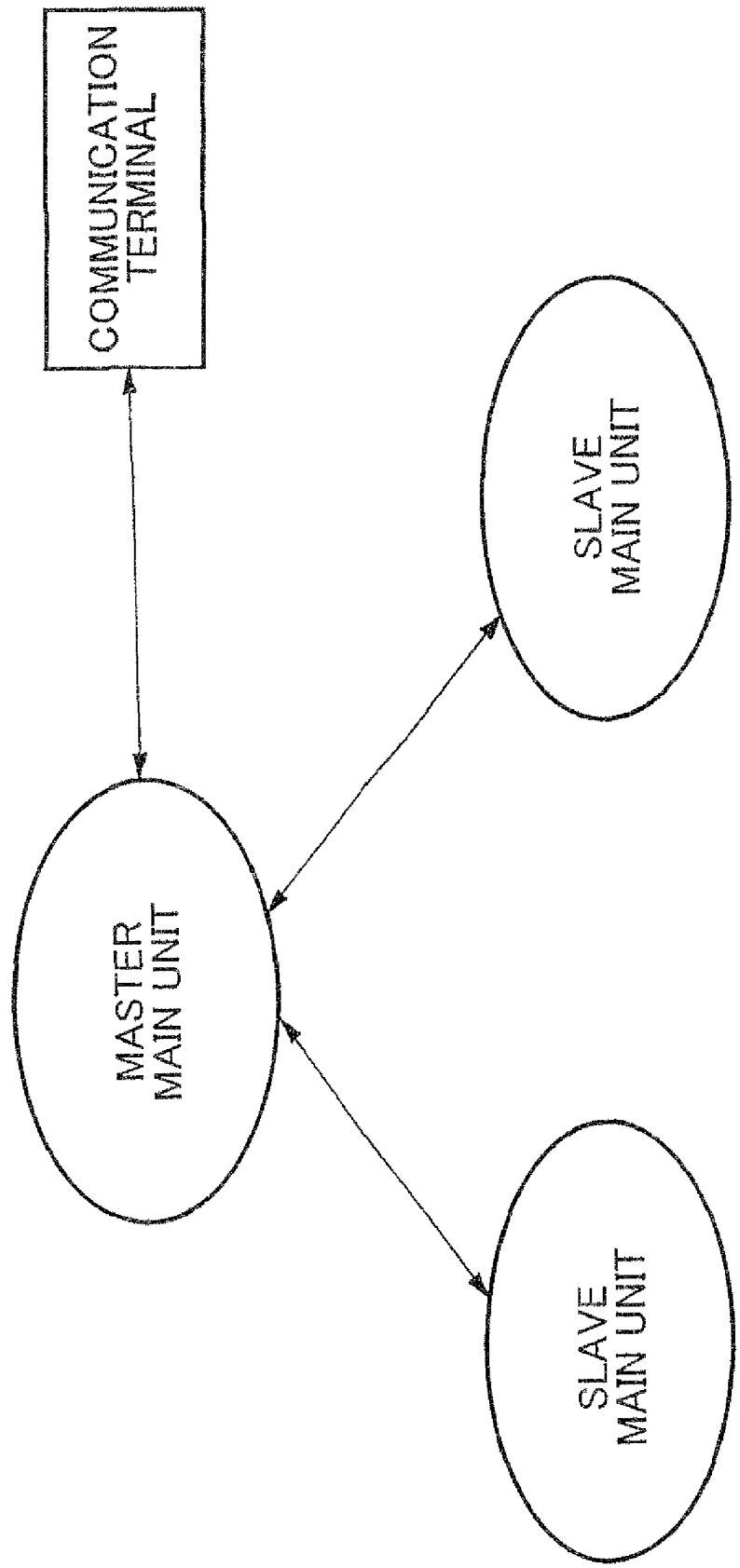
FIG. 13 is a conceptual diagram of the connection with a communication terminal according to networking of centralized resource management system.

FIG. 13 shows a conceptual diagram of the communication with a communication terminal in the networking of centralized resource management system.

There is only one master main unit which performs all call control and resource management on the network. The main units to be slave main units communicate with the master main unit, and follow all instructions from the master main unit.

The communication terminal communicates with the master main unit according to an IP address set in advance, thereby acquiring call information and controlling main units.

Figure 14:
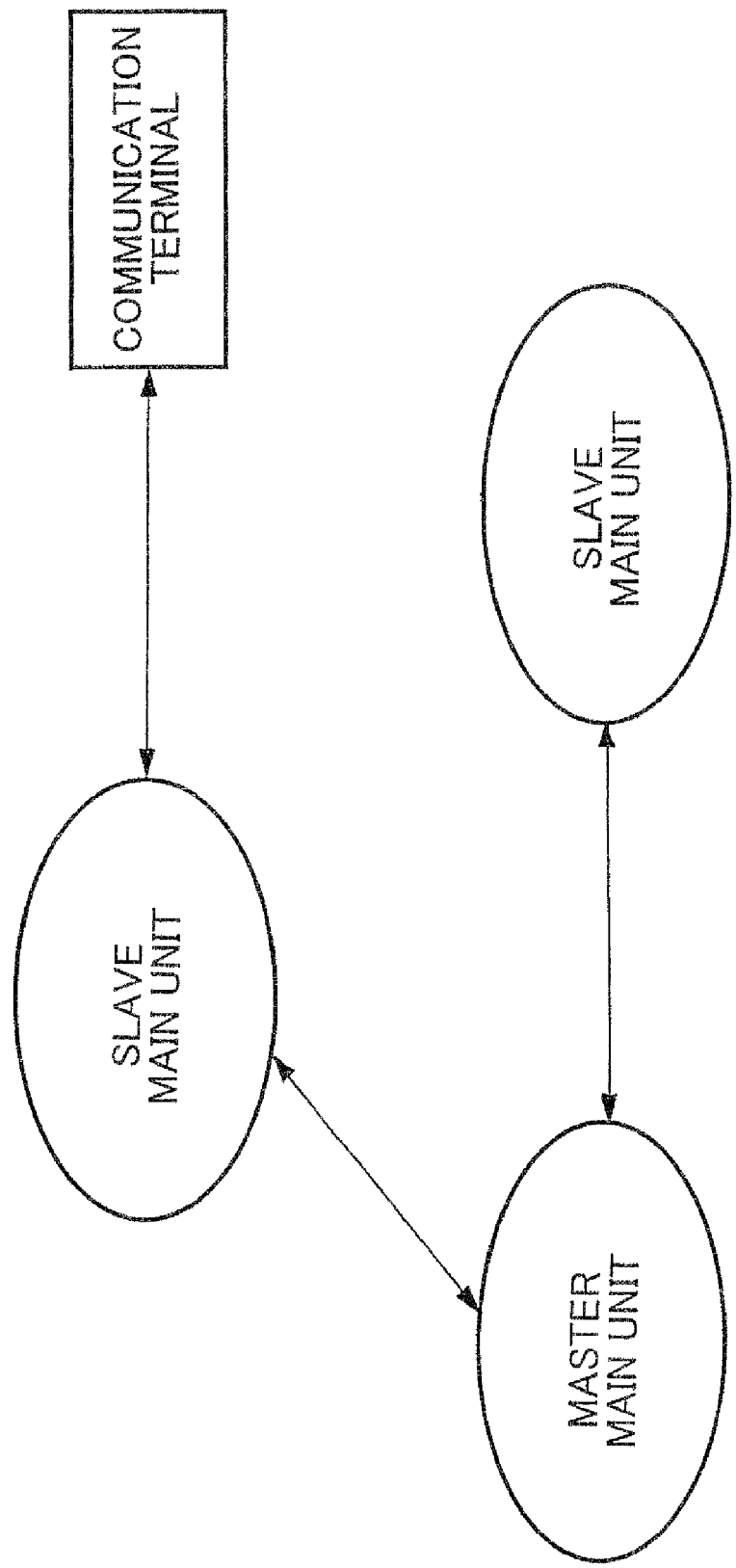
FIG. 14 is a diagram showing connections between a communication terminal, a master main unit, and slave main units when the master main unit is switched according to the embodiment of the present invention.

When the communications are interrupted or the system goes down, the master main unit is changed by the redundancy function. FIG. 14 shows a conceptual diagram of this state.

Here, one of the main units that have been the slave main units becomes the master main unit, and the main unit that has been the master main unit becomes a slave main unit. The communication terminal is typically configured so as to communicate with a single main unit, and thus can only communicate with the same partner even if the master main unit is switched.

Since that communication partner is no longer the master main unit but a slave main unit that only follows instructions from the master main unit, it can only communicate with the communication terminal but not return appropriate information.

The present embodiment then provides the technology of relaying the communication with this communication terminal so that it seems to the communication terminal that the communication is performed with the new master main unit directly, and to the new master main unit with the communication terminal directly.

In the configuration diagram shown in FIG. 2, all the main units are connected by the Internet Protocol, and the master main unit performs mutual communications with each of the slave main units. The master main unit manages all the system information such as call information and resource information. The slave main units basically have only the communication functions, and cannot perform appropriate processing on the communication terminal directly.

The communication terminal can establish connection only with a certain main unit.

The actual operation of the third embodiment will now be described.

Figure 15:
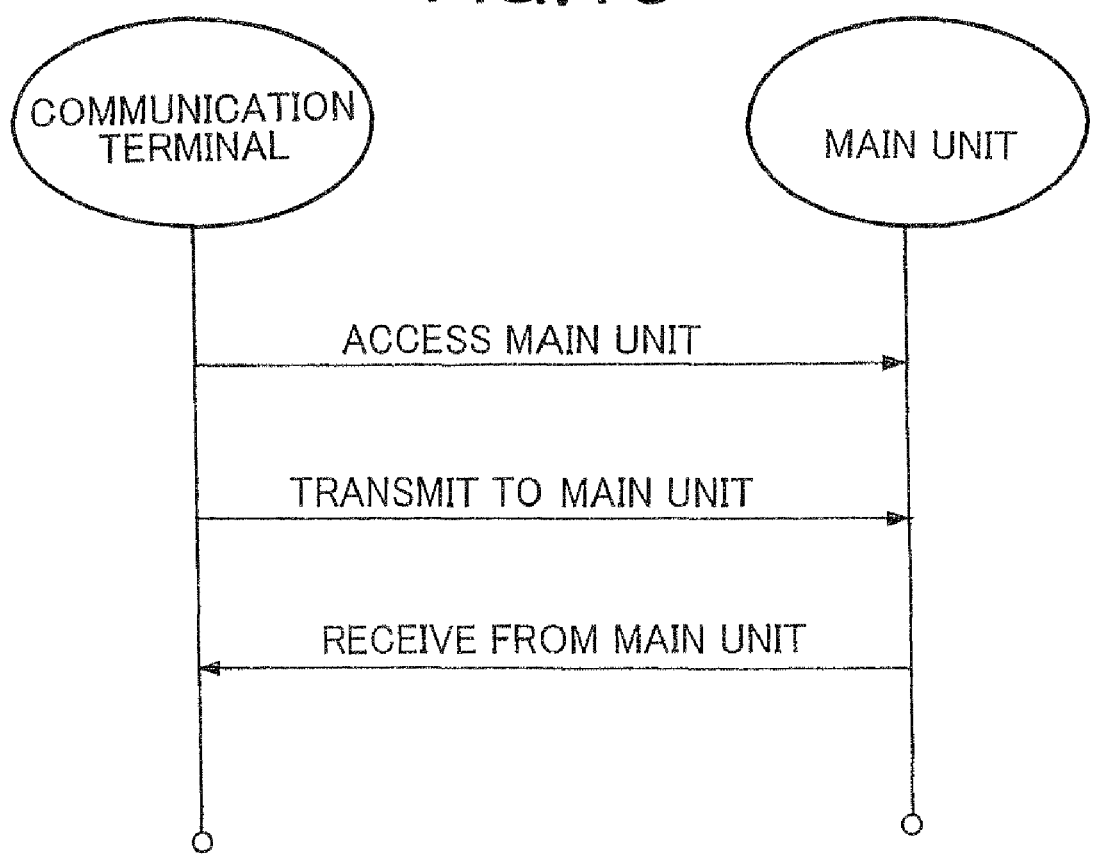
FIG. 15 is a conceptual diagram of conventional communication between a communication terminal and a main unit.

FIG. 15 shows a conceptual diagram of conventional communications between a communication terminal and a main unit.

To establish connection with the communication terminal, the main unit opens a certain port which is set by system data, and waits for connection on the port.

The communication terminal accesses the IP address and the port of the main unit.

This access is made by an application program of the communication terminal. The IP address and the port must be set in advance.

For CTI, for example, the main unit provides a CTI communication port 8000 and waits for access. The communication terminal activates the CTI application, sets the IP address and the communication port 8000 of the main unit, and accesses the main unit.

The communication terminal then transmits data to the main unit, thereby sending a command, and receives data, thereby acquiring the result.

Figure 16:
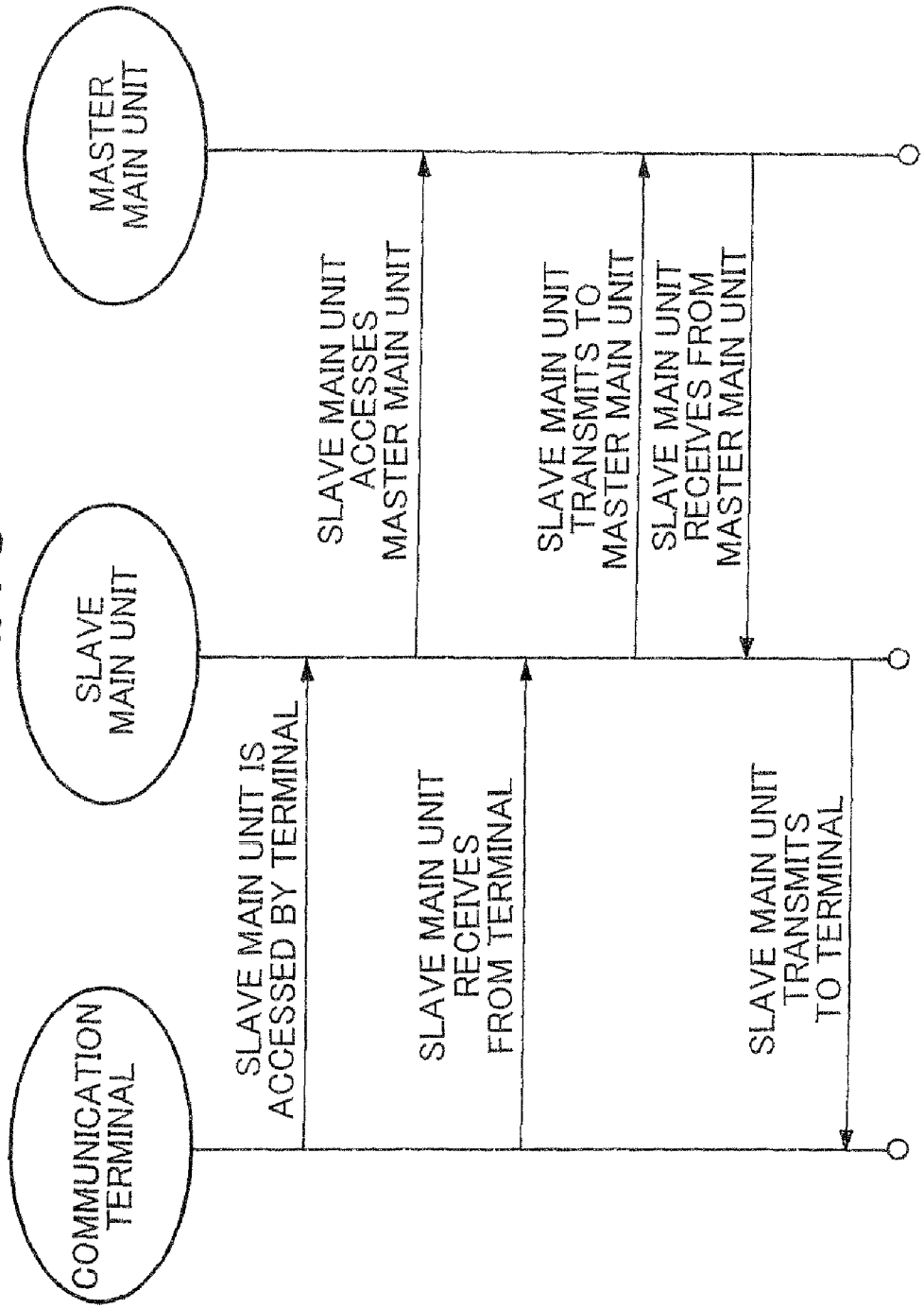
FIG. 16 is a conceptual diagram of the connections between a communication terminal and main units according to a third embodiment of the present invention.

In this regard, FIG. 16 shows a conceptual diagram of the third embodiment.

When the main unit is accessed by the communication terminal, it maintains the connection from the communication terminal and accesses the master main unit if it is not the master main unit itself.

Here, the master main unit (a former slave main unit) and the slave main unit (the former master unit) contain synchronized system data. The slave main unit can thus wait for access from the communication terminal on the same port as that of the master main unit, and can access the standby port of the master main unit.

Being accessed by the slave main unit, the master man unit recognizes the access as if from the communication terminal, and starts services. Meanwhile, accessing the slave main unit, the communication terminal recognizes the access as if to the master main unit, and also starts operation.

Subsequently, the slave main unit transfers data from the communication terminal to the master man unit, and transfers data from the master main unit to the communication terminal. This makes it possible for the communication terminal to perform communication without being aware at all of where the master main unit is actually located.

As a result, the application program of the communication terminal can be used without problems even if it is made by a third party. Since the master main unit recognizes that the communication terminal is in connection as heretofore, it requires no change in processing, either.

Figure 17:
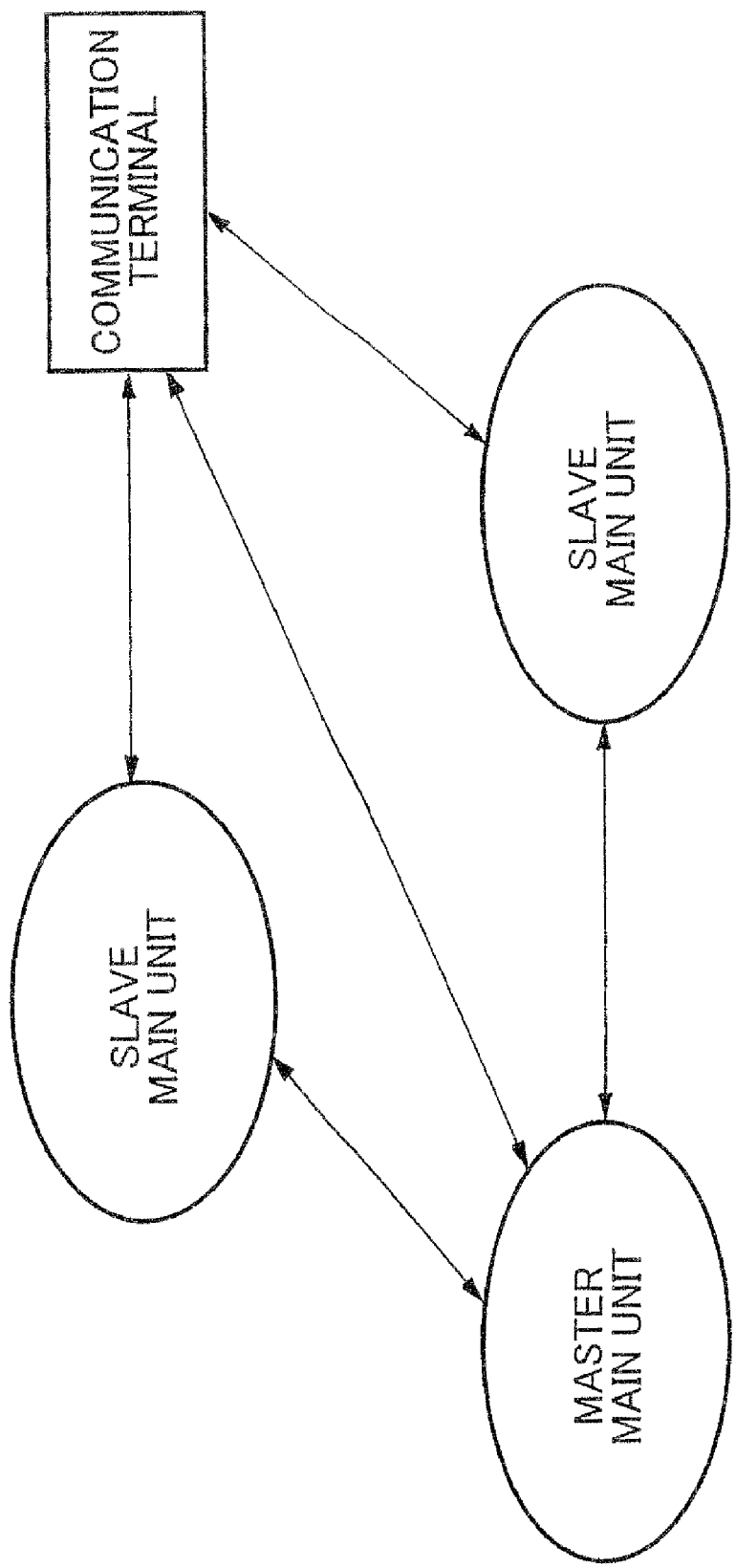
FIG. 17 is a diagram showing that the communication terminal can access any of the main units according to the third embodiment of the present invention.

As shown in FIG. 17, the communication terminal can communicate with the master main unit regardless of which main unit it is connected to. The communication terminal therefore needs only to register any one of the main units on the network as its communication partner, not to be aware of which is the master main unit.

By means of switching of master main units by the redundancy function, the use of the present invention can avoid the problem that the master main unit becomes inaccessible to the communication terminal when changed. Since the conventional operations of the communication terminal and of the master main unit can be guaranteed, there is no need to modify the application.

The third embodiment can avoid the conventional problem of vulnerability in the networking of centralized management system, that the entire network becomes inoperable when the main unit serving as the master ceases to function properly.

This function is particularly significant and is even indispensable for systems that may be used for mission-critical services such as a telephone set.

Fourth Embodiment

The operations when the master main unit goes down have been described in the second and third embodiments. The fourth embodiment will deal with situations where the system is recovered.

The fourth embodiment is to automatically detect recovery of a network that has been temporarily divided by a failure or the like, whereby the network is integrated into an original operating state automatically.

In the second and third embodiments, an alternative master main unit is selected from among the slave main units so that the entire network can continue to operate without going down when the master main unit in the networking of centralized resource management system with no functional limitations (hereinafter, centralized management networking) goes down or when communications can no longer be performed because of a network failure.

Now, when an alternative master main unit is selected, it simply continues to operate as the alternative master main unit even if the communications between the original master main unit and the other main units are recovered. The resulting two master main units can both continue to operate, whereas the two series of main units are capable of communication with each other, i.e., the network remains divided.

In the fourth embodiment, when a network failure occurs and then the communication between the alternative master main unit and the original master main unit is recovered, the recovery is automatically detected to reconstruct the network with respect to the original master, thereby solving the foregoing problem.

More specifically, the alternative master main unit periodically monitors the state of the original master main unit. If the recovery of the original master main unit is detected, the alternative master main unit reconnects itself and its subordinate slave main units with the original master main unit as a slave main unit. As a result, the network is automatically integrated after the recovery of communication, so that it can continue to operate in the same state as before the failure.

Figure 18:
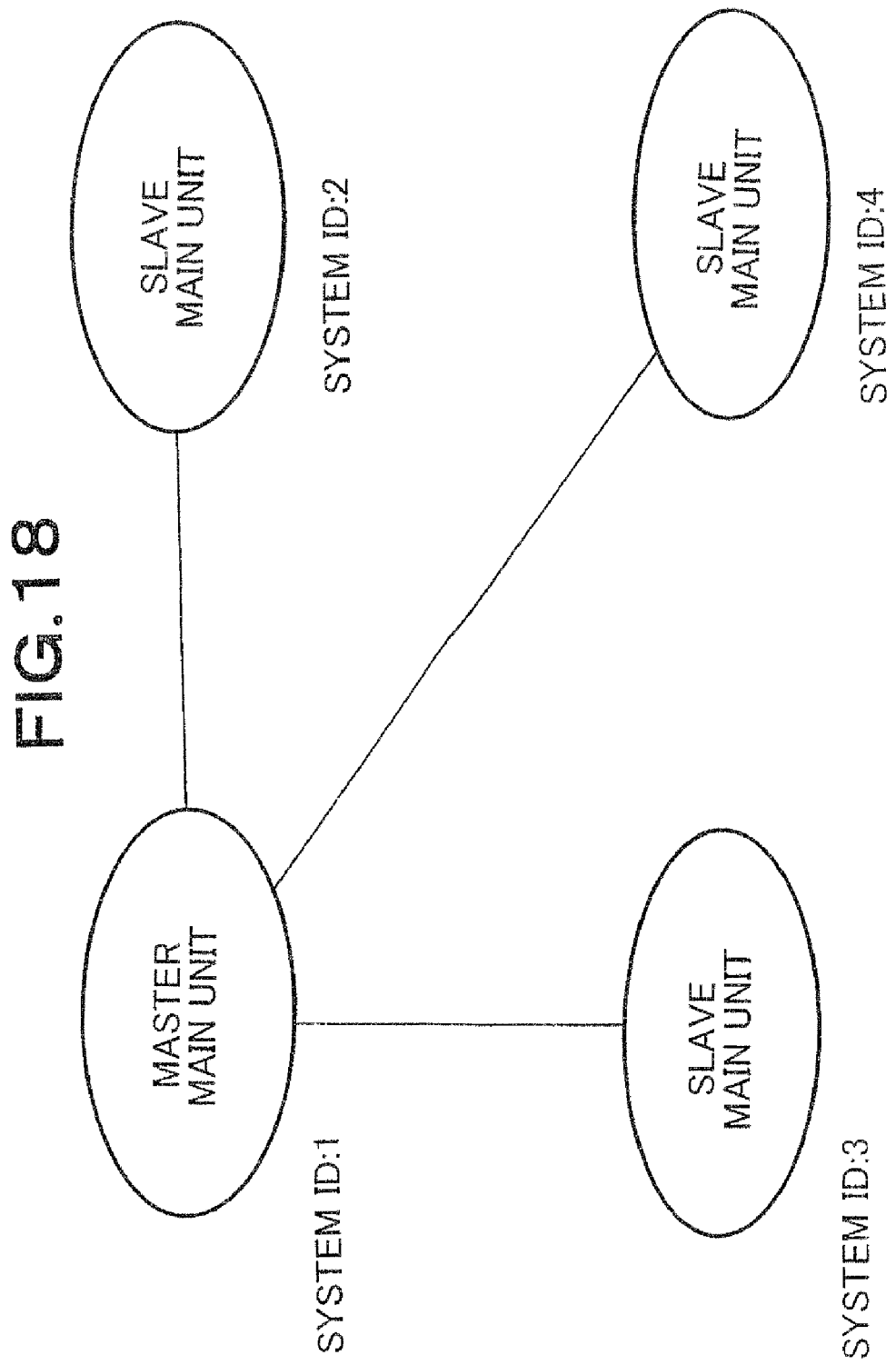
FIG. 18 is a diagram showing connections between main units according to a fourth embodiment of the present invention in normal state.
Figure 19:
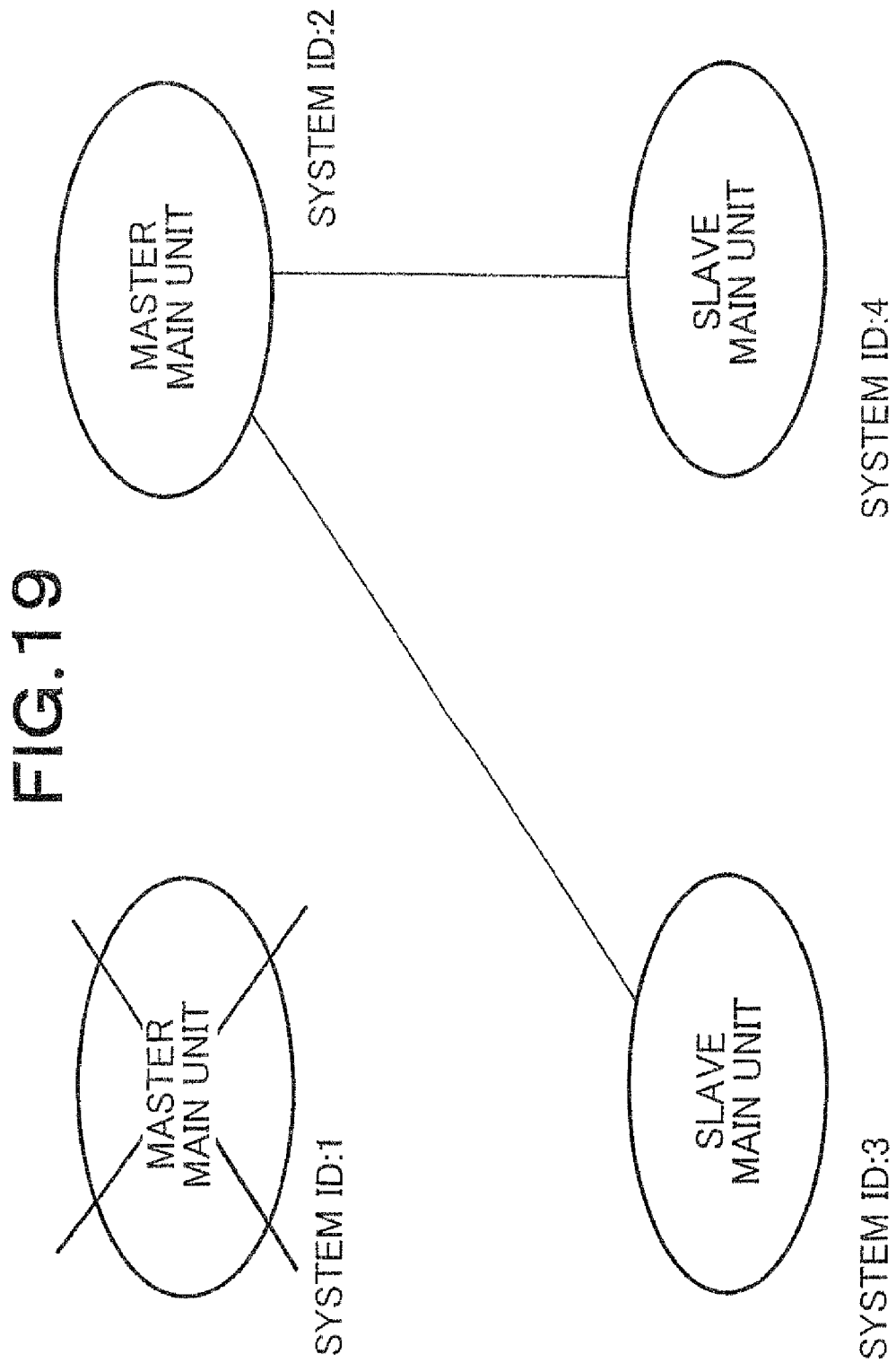
FIG. 19 is a diagram showing connections between the main units according to the fourth embodiment of the present invention when a failure occurs in the top-priority master main unit.
Figure 20:
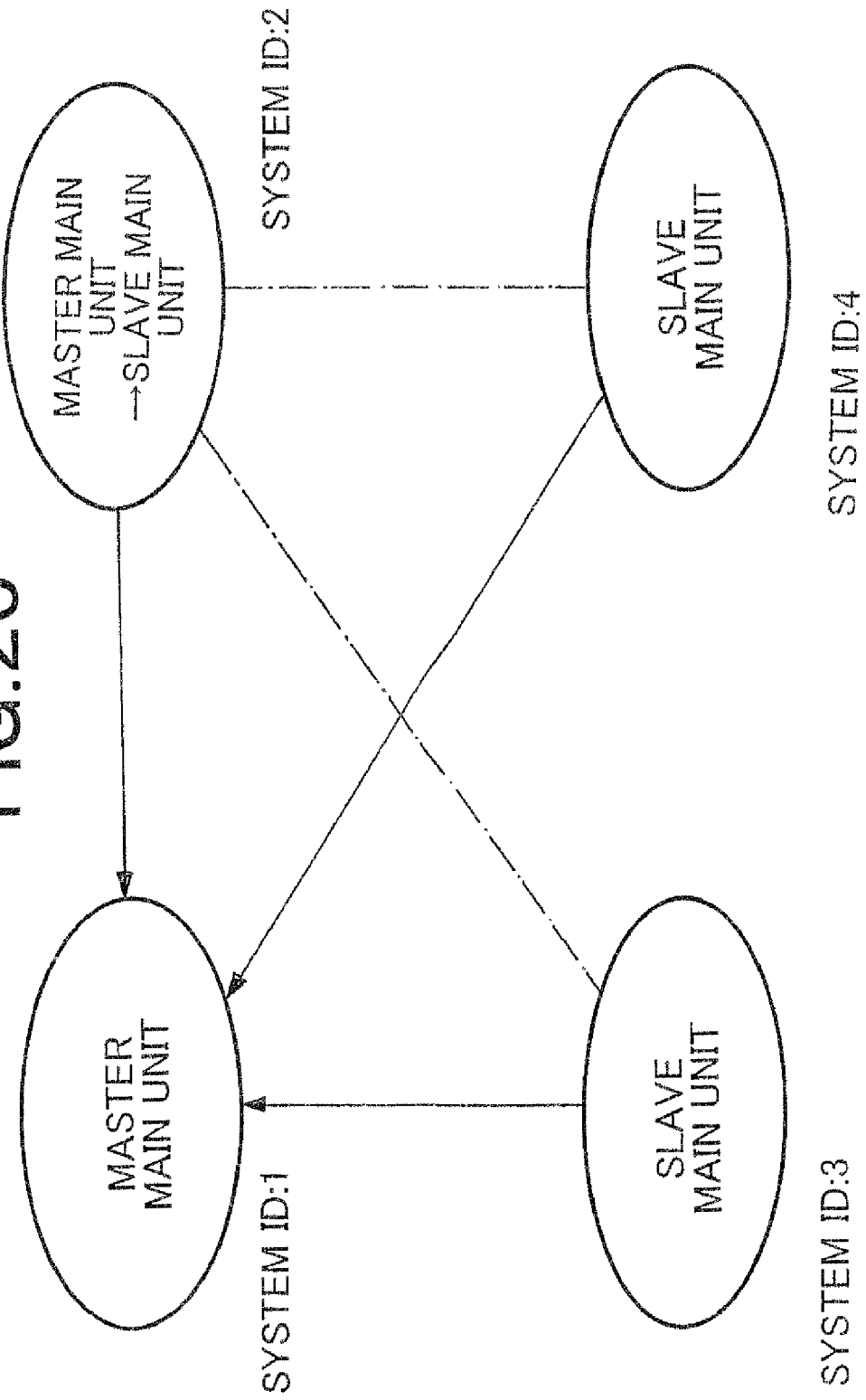
FIG. 20 is a diagram showing connections between the main units according to the fourth embodiment of the present invention when the top-priority master main unit is recovered from the failure.

FIGS. 18, 19, and 20 show conceptual diagrams of the fourth embodiment.

As shown in FIG. 18, in the centralized management networking, the main unit to be the master manages and controls the resources of the main units to be slaves in an integrated fashion. When the master main unit goes down, there is no main unit to exercise control. The mechanism of selecting an alternative master to continue operation has thus been invented as described in embodiments 2 and 3 (FIG. 19). The fourth embodiment will detail a mechanism that can reconstruct the network to continue original operations when the original master main unit is recovered as shown in FIG. 20.

Figure 21:
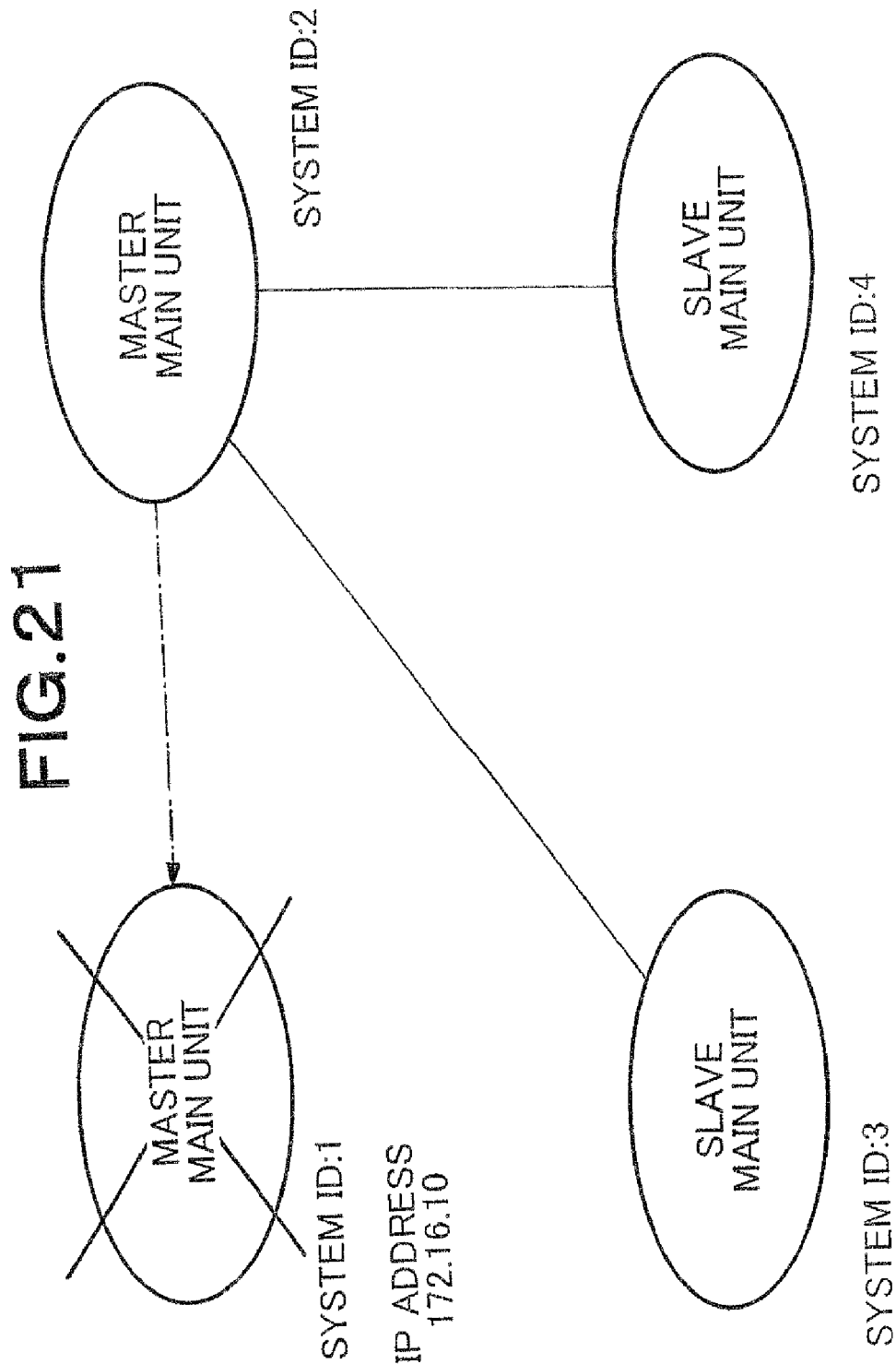
FIG. 21 is a diagram showing that an alternative master main unit monitors the failed top-priority master main unit for recovery according to the fourth embodiment of the present invention.

FIG. 21 shows a configuration diagram. Suppose that a fail-over (the selection of an alternative master main unit and the reconstruction of the network upon a failure) occurs and the network is formed with respect to the alternative master main unit. The alternative master main unit acquires the IP address of the original master main unit, which is set in advance, and runs the function of monitoring the original master main unit (hereinafter, referred to as "top-priority master main unit") for recovery.

If the IP address of the top-priority master is stored in the top-priority master itself in advance, the data is automatically transmitted to each node (main unit) for synchronization. After a fail-over, the top-priority master main unit can thus be monitored for recovery based on that IP address.

Figure 22:
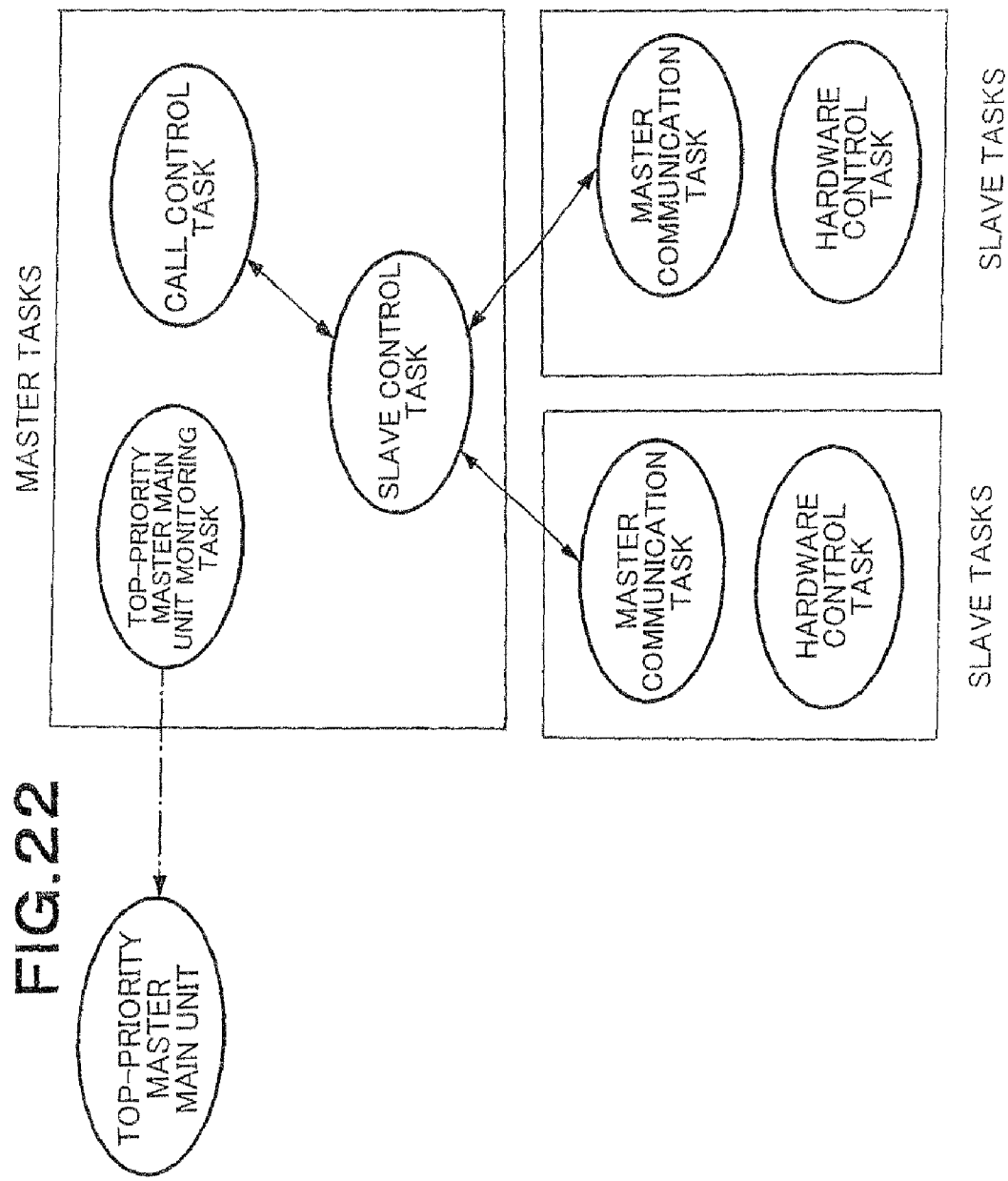
FIG. 22 is a conceptual diagram of a task configuration for monitoring the recovery of the master according to the fourth embodiment of the present invention.

FIG. 22 shows a conceptual diagram of the task configuration for monitoring a master recovery.

When a main unit to be the alternative master main unit starts to operate as the alternative master main unit, it compares its own IP address and the IP address of the top-priority master. If the IP addresses do not match, the main unit determines itself to be the alternative master main unit, and activates the task of monitoring the top-priority master main unit for recovery. This task runs at regular intervals with low priority, repeating a single operation of attempting access to the IP address of the top-priority master.

In the meantime, the master main unit's tasks such as controlling the slave main units are performed as usual. The master main unit can thus monitor the top-priority master main unit for recovery while controlling the stave main units as usual, thereby keeping the networking in operation.

Figure 23:
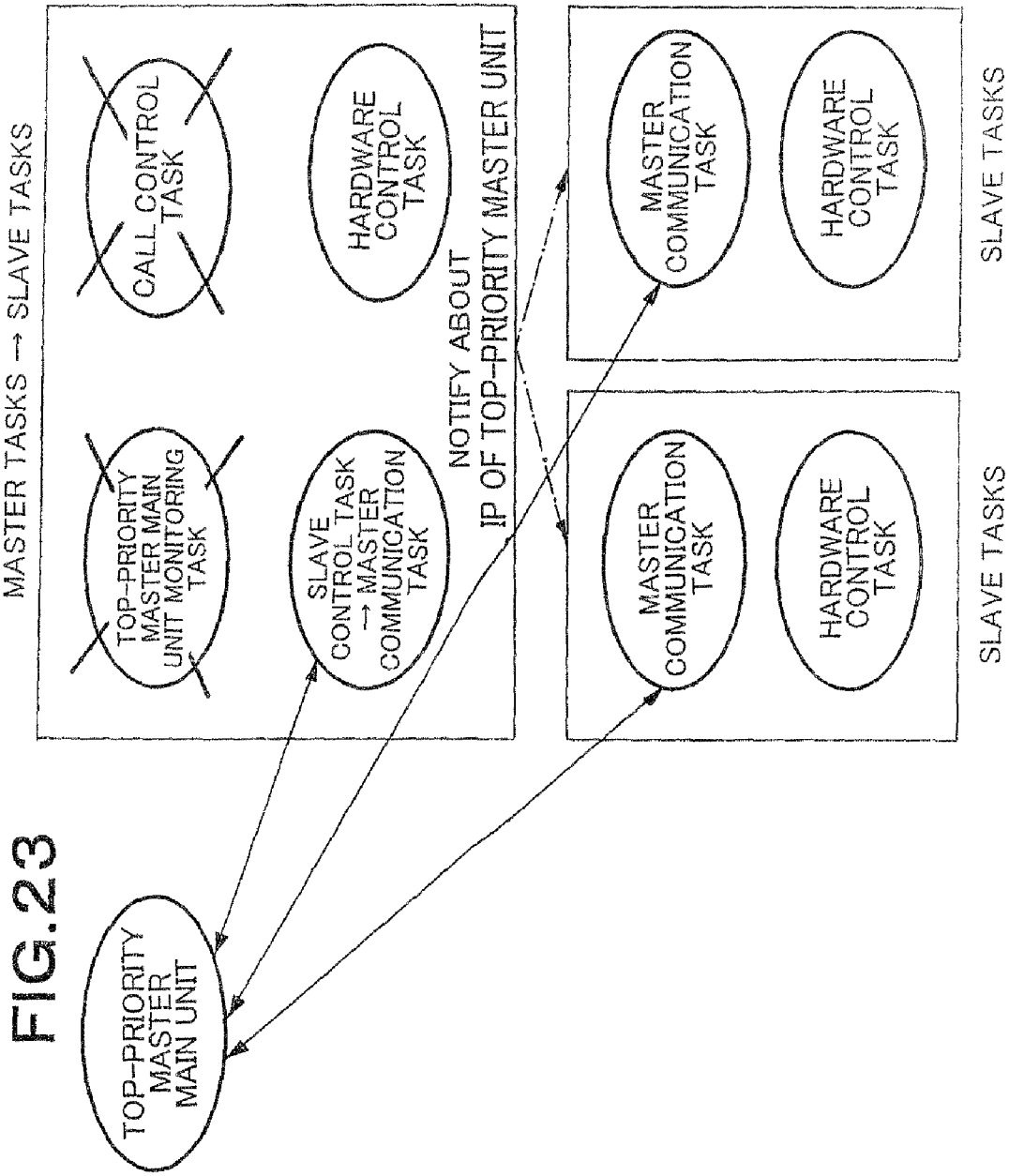
FIG. 23 is a conceptual diagram of operations according to the fourth embodiment of the present invention when the top-priority master main unit is recovered and the alternative master main unit detects it.

FIG. 23 shows a conceptual diagram of the operations when the top-priority master main unit has been recovered and the alternative master main unit has detected it.

When the recovery of the top-priority master main unit is detected by the top-priority master main unit monitoring task, the alternative master main unit starts operations to change itself into a slave main unit and switch the master main unit for controlling the slave main units from the alternative master main unit to the top-priority master main unit.

As shown in FIG. 23, the alternative master main unit initially transforms itself from the master main unit into a slave main unit, and renews connection to the top-priority master main unit.

Here, the top-priority master main unit monitoring task and the call control task are deleted since they are no longer in use. The slave control task is switched to the master communication task. The main unit then generates a hardware control task, and switches the operation mode so as to operate as a slave main unit itself. The main unit notifies the slaves that have been its subordinates about the IP address of the top-priority master main unit, instructs them to switch connection to the top-priority master main unit, and connects itself to the top-priority master main unit as a slave main unit.

Receiving the instruction, the slave main units switch connection from the alternative master main unit to the top-priority master main unit, and switch operation to come under the control of the top-priority master main unit.

By the foregoing operations, the alternative master main unit and the slave main units subordinate thereto can renew the connections to the top-priority master main unit, returning to the connection state before the fail-over. This makes it possible to restore the operating condition quickly after the recovery of the network.

Figure 24:
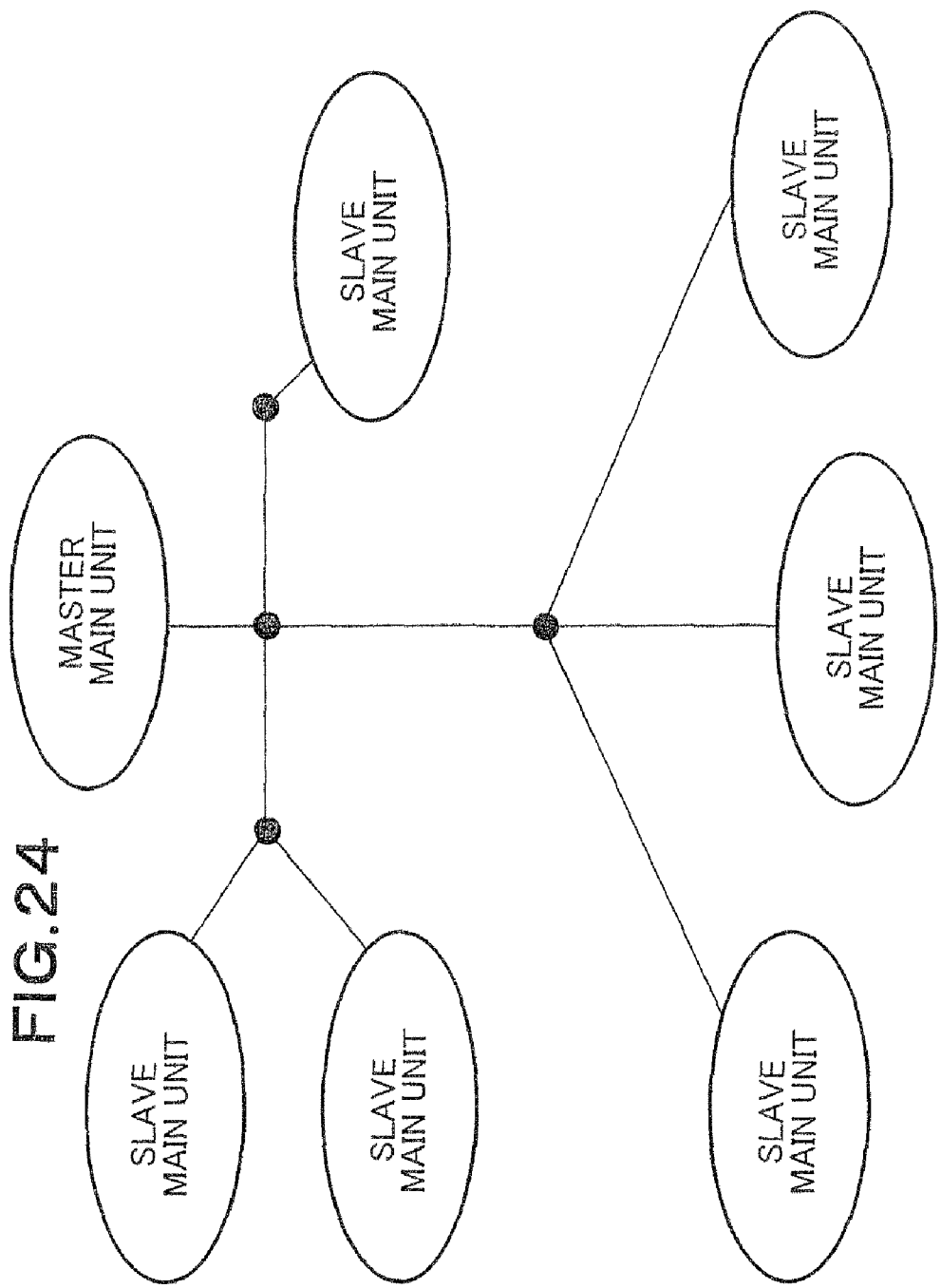
FIG. 24 is a diagram showing an example of a network that includes a master main unit and slave main units connected to each other according to the fourth embodiment of the present invention in normal state.

Now, assume a network configuration as shown in FIG. 24.

The black circles shall represent routers or other communication devices for connecting networks to each other.

Figure 25:
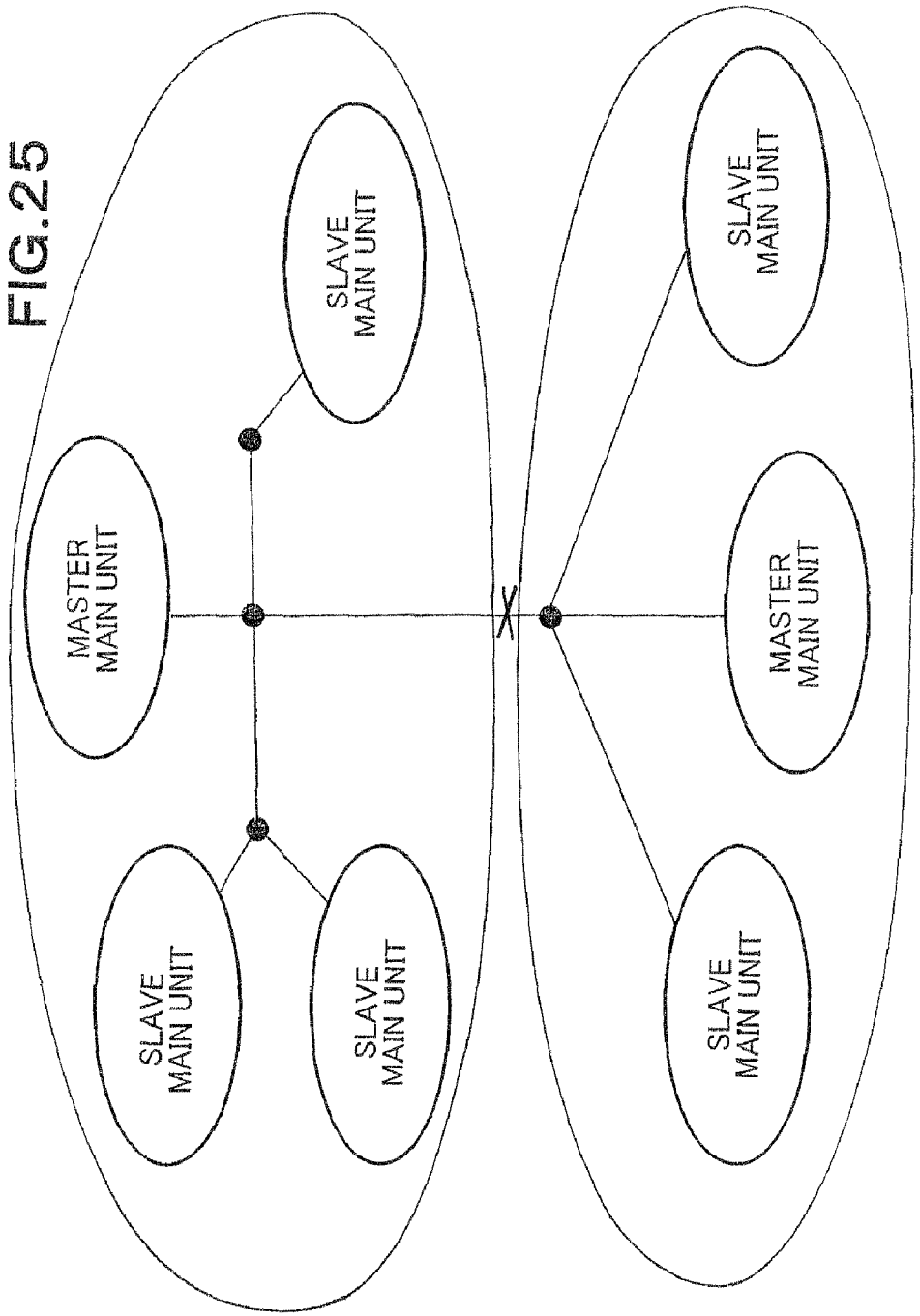
FIG. 25 is a diagram showing an example of the network that includes the master main unit and the slave main units connected to each other according to the fourth embodiment of the present invention when part of the network is disconnected.

Suppose that a communication failure occurs between networks as shown in FIG. 25. The second and third embodiments have proposed the methods of reconstructing the networks so as to form largest networks between nodes that can communicate with each other. When the communication failure occurs between the networks as shown by X in the diagram, two networks are thus formed as shown by the respective ellipses in the diagram. The networks can make network operations, though to a limited extent, with respect to the respective master main units.

According to the fourth embodiment, when the failure between the networks is recovered, the isolated network shown to the bottom can detect the recovery of the master main unit shown to the top and restore the original connections shown in FIG. 24 by using the method described in the foregoing FIGS. 22 and 23. This makes it possible to provide operations of limited networks when a failure occurs, and restore the complete network connection when the failure is recovered.

In FIG. 24, the black circles represent routers or other communication devices for connecting networks to each other. The different networks are mutually connected by the routers, and the main unit to be the master manages the information on all the nodes in an integrated fashion, thereby achieving the networking. When a communication failure occurs between the networks, the fail-over function is thus activated to configure respective largest networks as shown in FIG. 25.

When the communication failure between the networks occurs in the network configuration shown in FIG. 24, an alternative master main unit is selected by the fail-over function so as to maximize the communications in the divided networks as shown in FIG. 25, and the networks are reconstructed. When the main unit to be the alternative master main unit starts to operate as the alternative master main unit, it activates the top-priority master main unit monitoring task shown in FIG. 22, thereby starting to monitor the top-priority master for recovery.

When the top-priority master main unit or the network is recovered, it becomes possible to receive a response from the top-priority master main unit. Based on this, the alternative master main unit determines that the failure is recovered, and starts the operations for recovery.

Since the slave main units operating under the alternative master main unit are going to be controlled by the new master main unit, the alternative master main unit notifies the slaves subordinate to the alternative master main unit about the change of the master main unit and the IP address of the new master main unit.

This requires no special processing of the slave main units since the slave main units basically continue to operate as slave main units in the same way, with only a difference in the destination of connection. When the master main unit becomes a slave main unit, on the other hand, it is necessary to terminate various tasks for operating as an alternative master main unit, shift into slave tasks, and release various resources that it has managed in a centralized fashion as a master main unit. Description will now be given of the release of resources.

As shown in FIG. 5, the centralized management networking employs the method of managing the resources of the network-connected nodes in an integrated fashion by the main unit to be the master main unit.

When a main unit finishes serving as a master, it thus clears the state of management of these resources.

After these tasks and resources are cleared, the alternative master main unit shifts into a slave main unit, renews its connection to the top-priority master main unit, and subjects itself to control. The state of being an alternative master main unit is internally cleared, which requires no physical resetting of the system and thus allows a quick recovery operation.

By the above processing, it is possible to quickly restore the state before the failure completely, and to continue operations.

The application of the present embodiment makes it possible to monitor the recovery of a failure automatically and to restore the original operating state. Since the failure recovery can be constantly monitored to perform recovery processing quickly, it is possible to construct a system that runs in an optimum state all the time.

Note that the recovery processing requires no physical resetting of the system. The switching of the tasks and the change of the connection destinations require resetting the packages for controlling the terminals and lines, however, and it is therefore impossible to maintain the same states of calls and the like as before This may require that the recovery processing be executed manually when the system is idle, instead of it being performed automatically. Alternatively, the system condition may be monitored for a recovery so that the recovery processing is executed at idle time.

Fifth Embodiment

The first embodiment has solved most of the conventional problems by using the method of networking of centralized management system as reference configuration to avoid the problems in distributed networking systems.

That is, the networking of centralized resource management system has been invented to facilitate information management and achieve networking with no functional limitations. This concentrates processing upon a single main unit, however, and the load on the CPU is so increased that a large number of resources cannot be controlled. In other words, since the single master main unit controls all the systems on the network, massive amounts of load are concentrated on the master main unit.

It is thus an object of the fifth embodiment to achieve networking by utilizing the CPU of a personal computer (hereinafter, referred to as "PC") which has high performance, thereby reducing the load on the master main unit which is subjected to high traffic volumes, and improving the affinity for external applications.

The fifth embodiment avoids the foregoing problem by using a powerful general-purpose PC as the system to be the master main unit, instead of an exchange. More specifically, equivalent programs to those of an exchange are run on the PC, whereby all main units and the PC are connected over an IP network. The PC, the master main unit, controls the hardware of the main units which are connected as slave main units.

The powerful CPU of the PC can thus be utilized to process large amounts of traffic from the slave main units.

Figure 26:
FIG. 26 is a conceptual diagram of networking of centralized resource management system according to a fifth embodiment of the present invention, with a PC as the master main unit.

FIG. 26 shows a conceptual diagram of the networking of centralized resource management system with a PC as the master main unit.

FIG. 26 shows that the PC is operated as the master main unit, and actual main units are controlled as slave main units.

It will be understood that the PC cannot directly control exchange hardware, and the exchanges are thus controlled by the respective slave main units connected.

This will be described with reference to FIG. 27.

Figure 27:
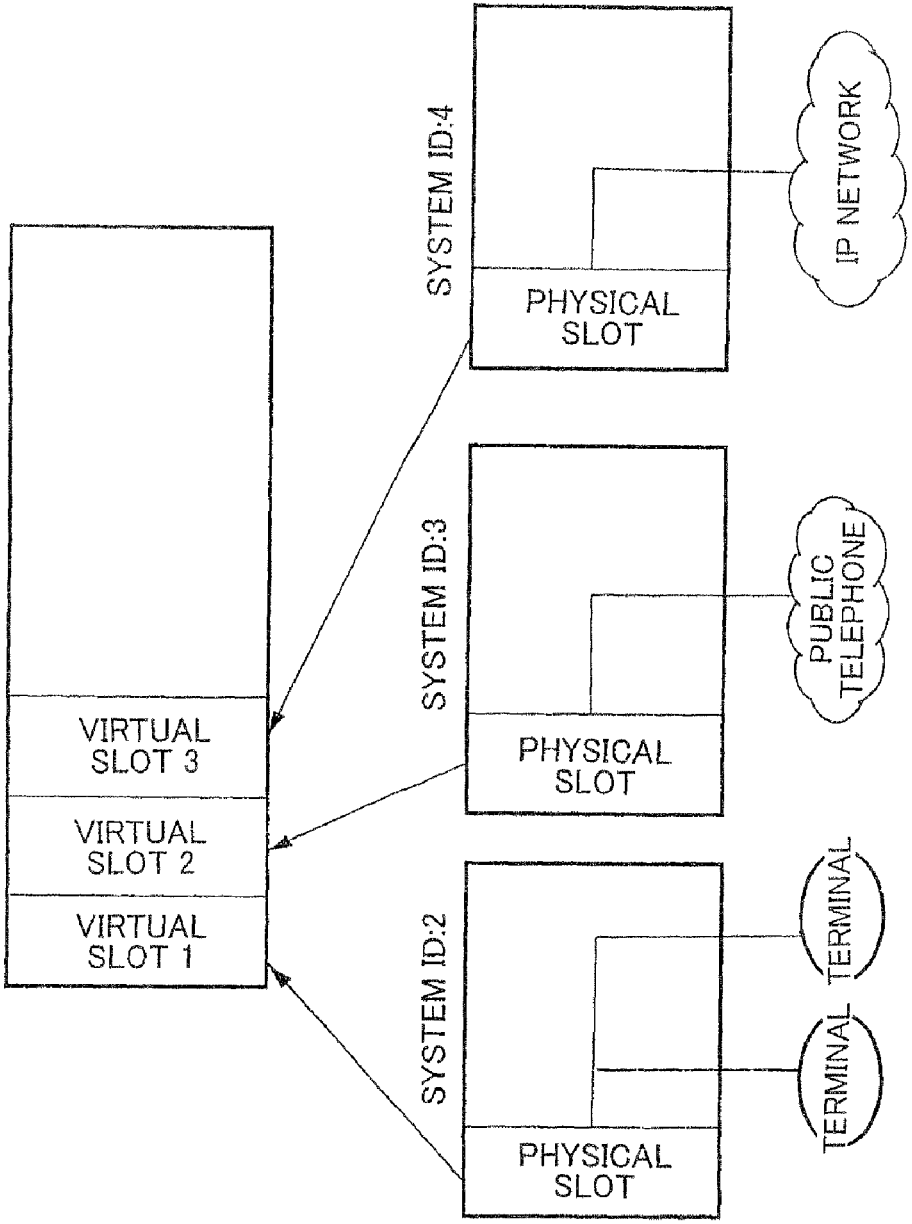
FIG. 27 is a diagram showing the method of package management according to the fifth embodiment of the present invention.

The method of package management of FIG. 27 is an application of the reference configuration.

Packages, the real hardware, are installed in the slave main units of system ID 2, 3, and 4, while their information is transmitted to and managed in the master main unit of system ID 1.

All the information on the terminals, lines, and the like connected to the packages is also transmitted to the master main unit as upstream data.

Consequently, it seems to the master main unit, though having no package accommodation capability, that the packages are installed in itself.

Instructions to the actual packages are transferred to the respective systems to control the terminals, lines, and so on.

As a result, even the general-purpose PC having no capability of directly controlling packages can control the exchanges. The use of the high-performance CPU can also carry traffic even when a large number of slave main units are connected.

This alleviates the problem of the networking ascribable to centralized resource management, making it possible to construct networking of larger scales.

The networking of centralized resource management system includes the mechanism of selecting an alternative master main unit to continue operations in cases the master main unit goes down or communications are interrupted for any reason.

Suppose that the PC, the master main unit, goes down. According to the mechanism of FIG. 26, a main unit that ranks the highest among the main units connected as the slave main units, in terms of the master main unit candidate priorities set in advance, becomes the new maser main unit since the PC is no longer connected to the network. This means that a node having a low CPU power is going to serve as the master main unit.

To avoid this, a mechanism will be introduced in which a PC to be an alternative master main unit is provided on standby so that it operates when a failure occurs.

Figure 28:
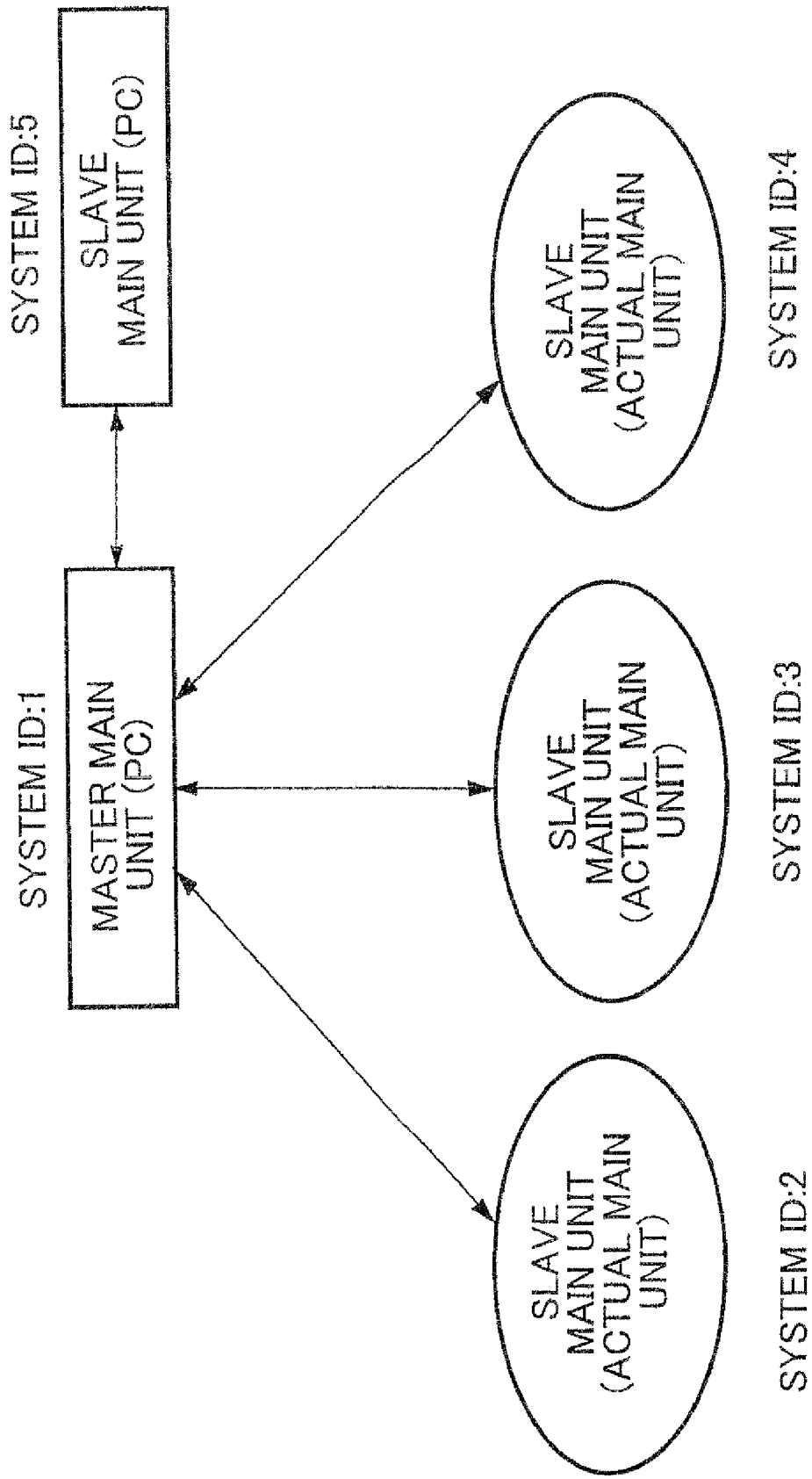
FIG. 28 is a conceptual diagram of networking of centralized resource management system according to the fifth embodiment of the present invention, with a first PC as the master main unit and a second PC as an alternative master main unit.

A practical example will be shown in FIG. 28.

FIG. 28 shows that a PC is added to the network shown in FIG. 26 as a new slave main unit.

Figure 29:
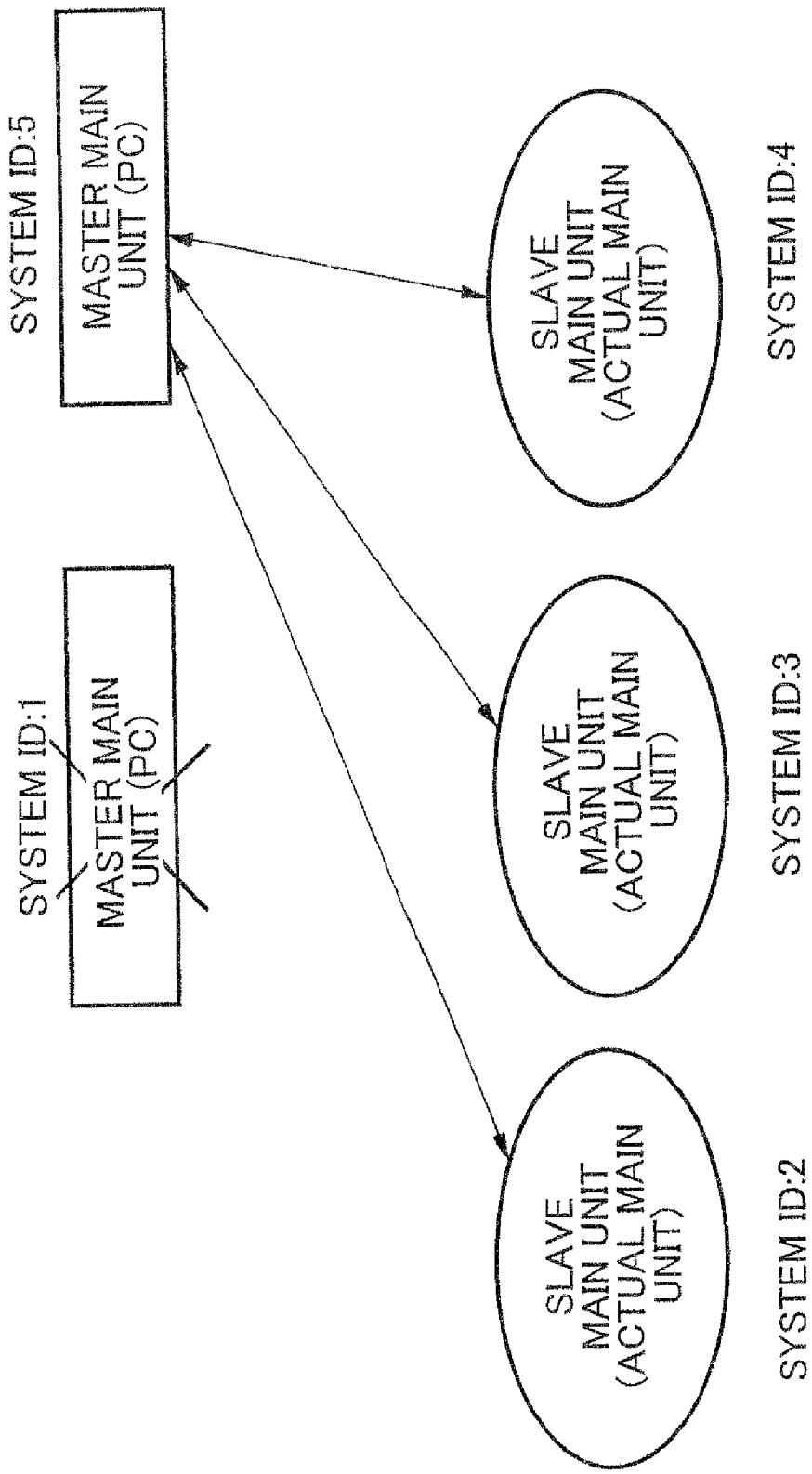
FIG. 29 is a diagram showing connections between the main units when the first PC ceases to function properly in the configuration shown in FIG. 28.
Figure 30:
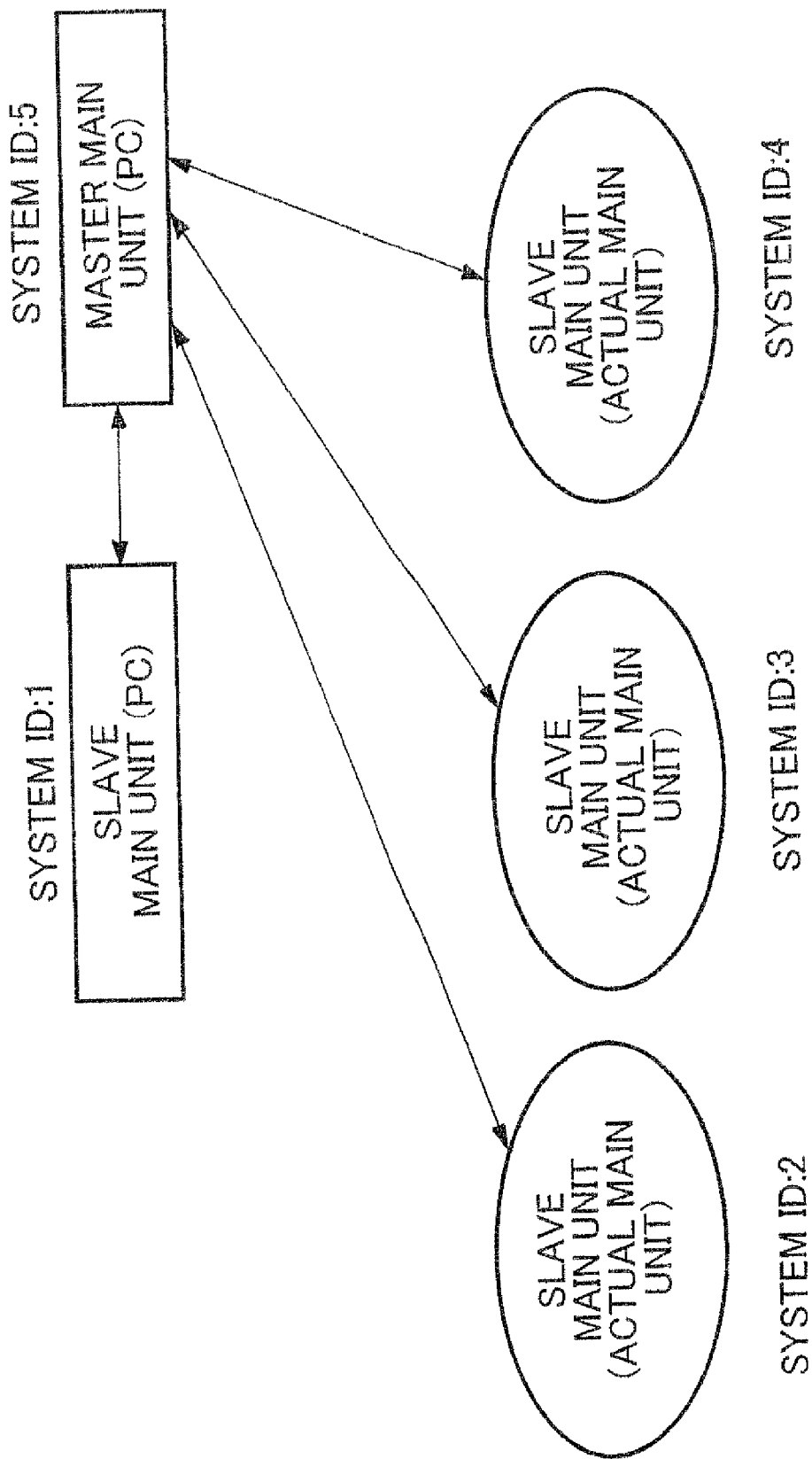
FIG. 30 is a diagram showing connections between the main units when the first PC is recovered in the configuration shown in FIG. 29.

The PC of the connected system ID 5 makes no particular operation and remains standby as long as the system 1, the master main unit, functions properly. When a failure occurs in the master main unit, the PC of system ID 5 detects it and starts to operate as the alternative master main unit. Consequently, even when the master main unit i.e. the PC fails as shown in FIG. 29, the PC having the same CPU power can take over the master main unit to prevent a decrease in traffic throughput. When the failure is recovered, the system 1 is connected as a slave main unit to the system 5 as shown in FIG. 30, being on standby for a failure. When the system 5 fails, the PC of the system ID 1 then starts to operate as the master main unit again.

The network can thus be operated as long as either one of the PCs is in operation, with the PC as the master main unit.

The systems 2, 3, and 4 are actual main units which have slots for packages to be installed in, and accommodate packages for connecting to terminals, a public line, and an IP network, respectively. These systems are operated as slave main units, and are IP-connected to and controlled by the PC of the system 1 which is running as the master main unit.

Running as the master main unit, the PC of the system 1 manages information collectively, including hardware information on the packages of the systems 2, 3, and 4, and call information, and performs call control on all the slave main units connected.

The system 5 is connected as a slave main unit to the system 1, and monitors the system 1 for a failure on standby.

Next, description will be given of specific approaches for realization.

The method pertaining to package resource management has been described with the reference configuration.

Now, description will be given of another aspect, of the method for using a PC as the master main unit.

Figure 31:
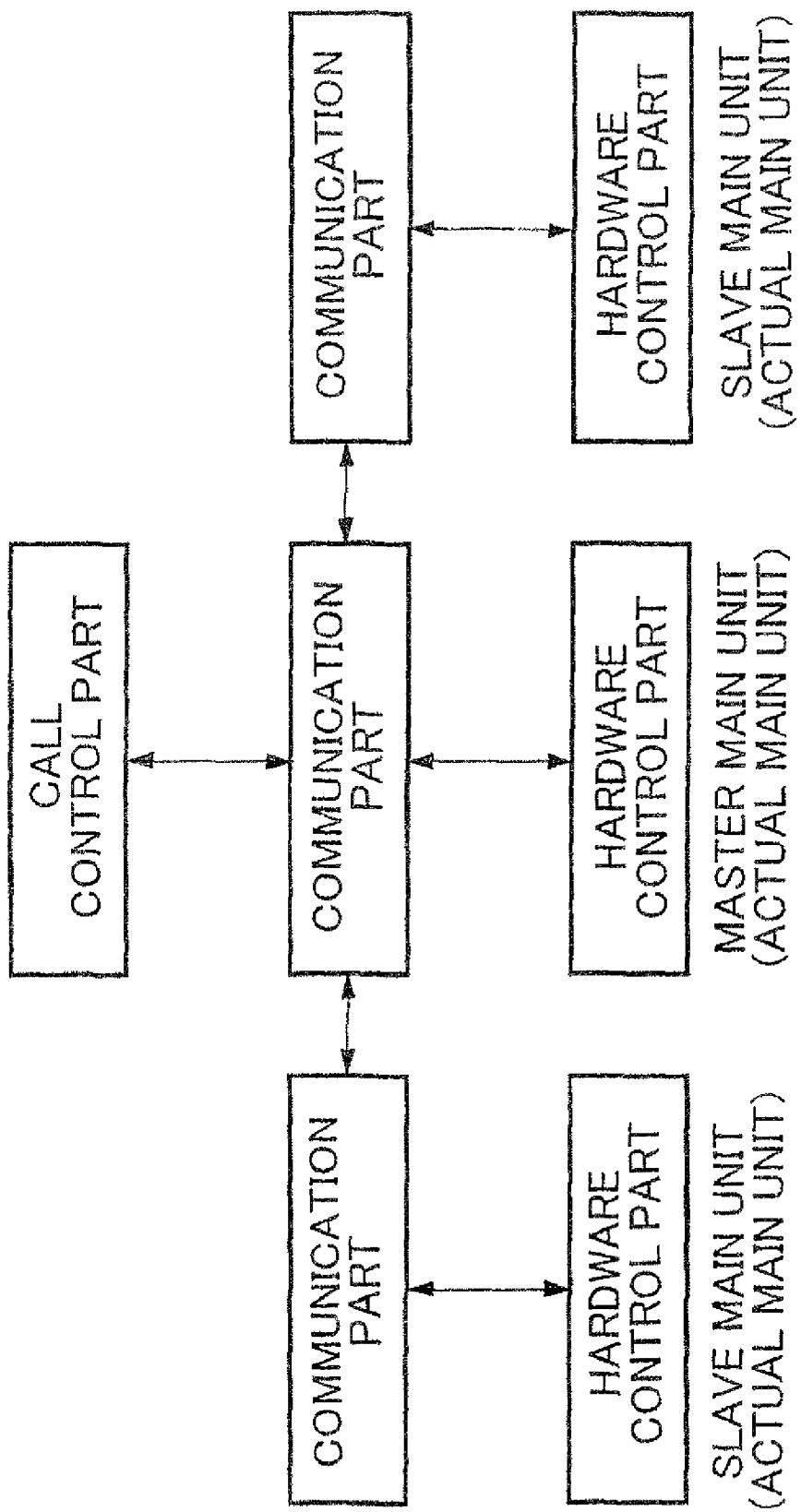
FIG. 31 is a conceptual diagram of networking where a conventional actual main unit serves as the master main unit.

FIG. 31 shows a conceptual diagram of the networking when a conventional actual main unit serves as the master main unit.

The functional modules according to the present invention are broadly classified into: a call control part for controlling incoming calls, conversations, and so on; communication parts for transmitting and receiving package data and the like between the master main units and the slave main units; and hardware control parts for receiving data from packages and giving instructions to the packages.

In FIG. 31, the call control part runs only in the main unit to be the master main unit. The slave main units do not perform call control.

The slave main units receive data from packages through the hardware control parts, and transmit the data to the master main unit through the communication parts.

The master main unit performs call control in the call control part based on the data, and transmits package data in response through the communication part. The slave main units receive the data and control the hardware.

Since the master main unit itself has slots for accommodating packages, its hardware control part operates to control the packages.

Figure 32:
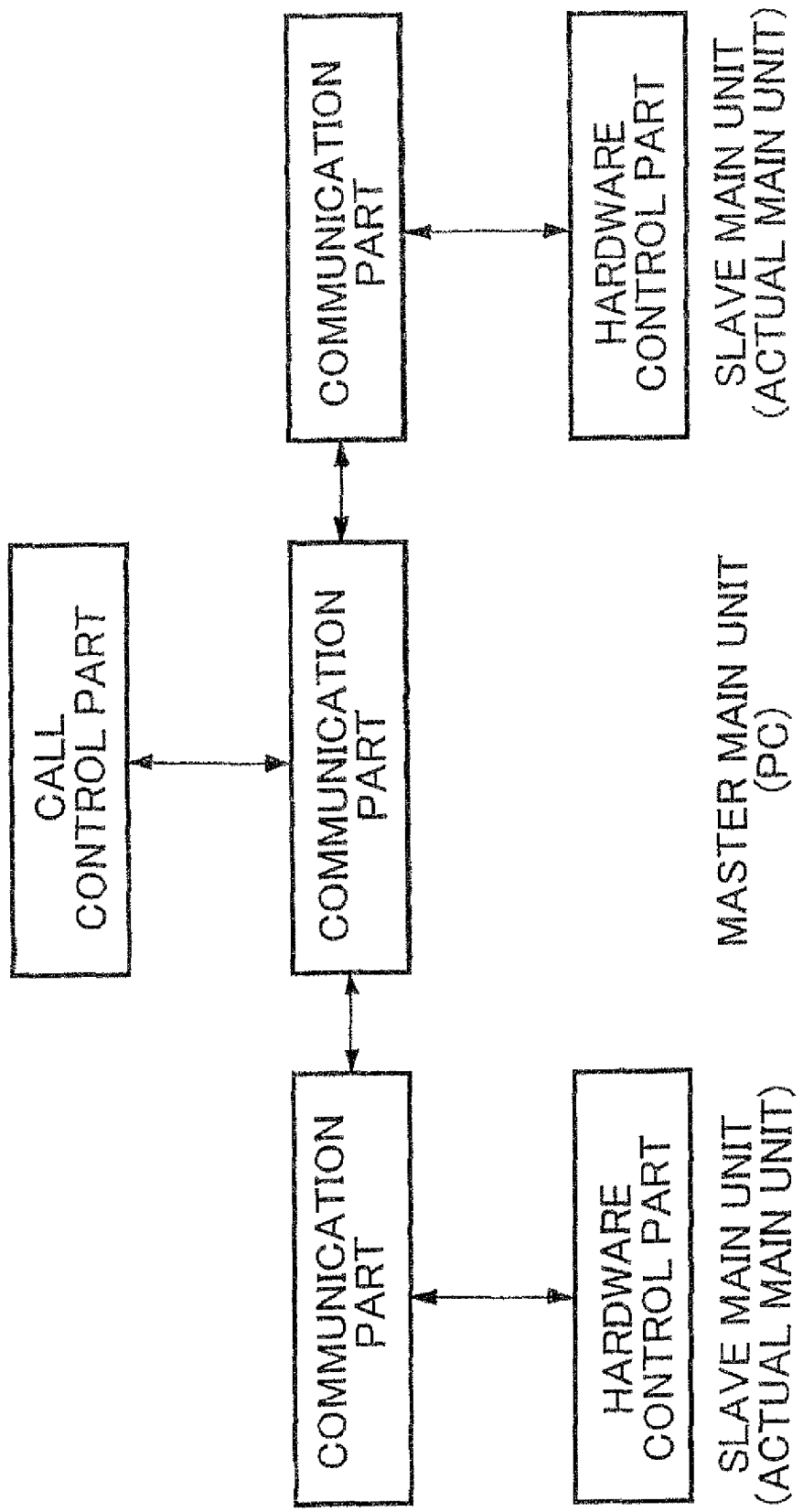
FIG. 32 is a conceptual diagram of networking when a PC is used as the master main unit.

FIG. 32 shows a conceptual diagram of functional modules according to the present invention.

The master main unit is a general-purpose PC and thus requires no hardware control part since it naturally has no capability of accommodating packages directly.

The hardware control operation itself is not only unnecessary, but must also be disabled since it attempts to control hardware which is not present.

Then, the modules to be implemented are the call control part and the communication part alone as shown in the diagram. These modules can be implemented even on the PC since their processing is not target-dependent.

The master main unit and the slave main units communicate with each other by using TCP/IP. The master main unit and the slave main units need not run on the same OSes as long as the OSes make equivalent processing. For example, Linux™ can be implemented on the PC while an embedded OS such as VxWorks™ and Nucleus Plus on the actual main units.

As shown in the diagram, the main units to be the slave main units basically operate with the communication part and the hardware control part alone.

Inexpensive CPUs will therefore be sufficient for the main units to be the slave main units while the PC of the master main unit requires a high-performance CPU. Since all the resource management concentrates upon the master main unit, the PC to be the master main unit also requires a large amount of memory resource. The main units to be the slave main units can operate with only an extremely small amount of memory resource since they perform no resource management at all.

The networking of centralized resource management system has the function of selecting an alternative master main unit in the descending order of the master main unit priorities set in advance, and continuing operations when the master main unit goes down. Here, lower priorities must be assigned to the actual main units and a higher priority to the backup PC so that the actual main units having only a low-power CPU and a small memory will not be selected for the alternative master main unit.

The fifth embodiment can be applied to use a system having a powerful CPU for the master main unit, making it possible to construct networking of even larger scale.

Since the software of the main unit can be executed on the PC, the affinity between the PC and the main unit improves. This facilitates integration of applications such as CTI (Computer Telephony Integration).

Sixth Embodiment

The sixth embodiment will deal with an even more concrete configuration.

Figure 33:
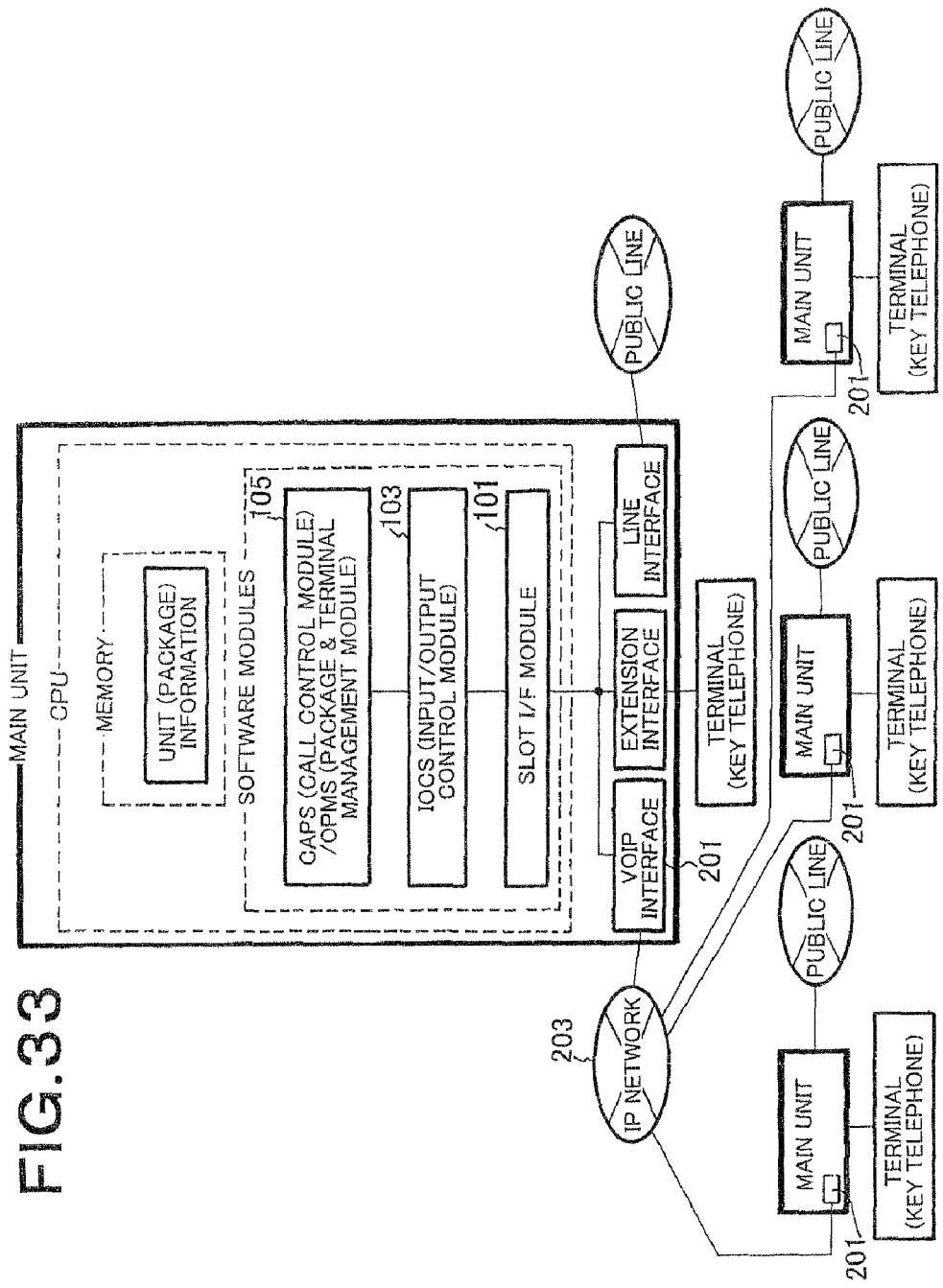
FIG. 33 is a block diagram showing a group of main units according to a conventional example.

FIG. 33 shows a group of main units according to a conventional example. Referring to FIG. 33, in the conventional example, the main units included in the group of main units are not classified between master and slave main units. The main units make respective independent operations, and are connected with an IP network 203 through respective VoIP interfaces 201. Each main unit includes the CAPS/OPMS 105, the IOCS 103, and the slot I/F module 101, but not the slot management module 109, the physical slot/virtual slot comparison table 111, or the slot control module 107.

Figure 34:
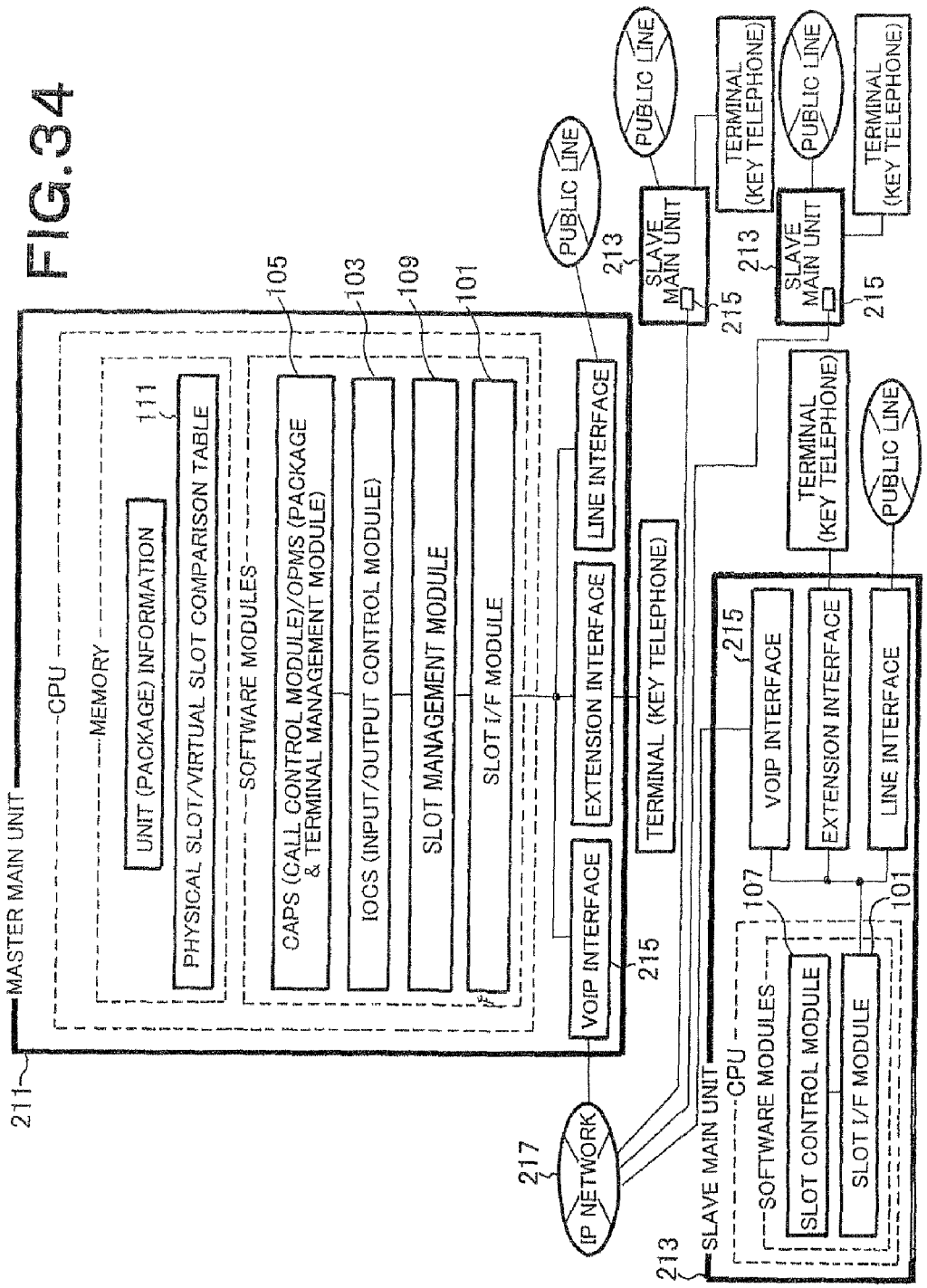
FIG. 34 is a block diagram showing a group of main units according to an embodiment of the present invention.

FIG. 34 shows a group of main units according to an embodiment of the present invention. Referring to FIG. 34, in the embodiment of the present invention, the main units included in the group of main units are classified into one master main unit 211 and a plurality of slave main units 213. The single master main unit 211 and the plurality of slave main units 213 are connected with an IP network 217 through respective VoIP interfaces 215. The plurality of slave main units 213 operate under the control of the single master main unit 211. The master main unit 211 includes the CAPS/OPMS 105, the IOCS 103, the slot management module 109, the physical slot/virtual slot comparison table 111, and the slot I/F module 101. Each slave main unit 213 includes the slot control module 107 and the slot I/F module 101.

Figure 35:
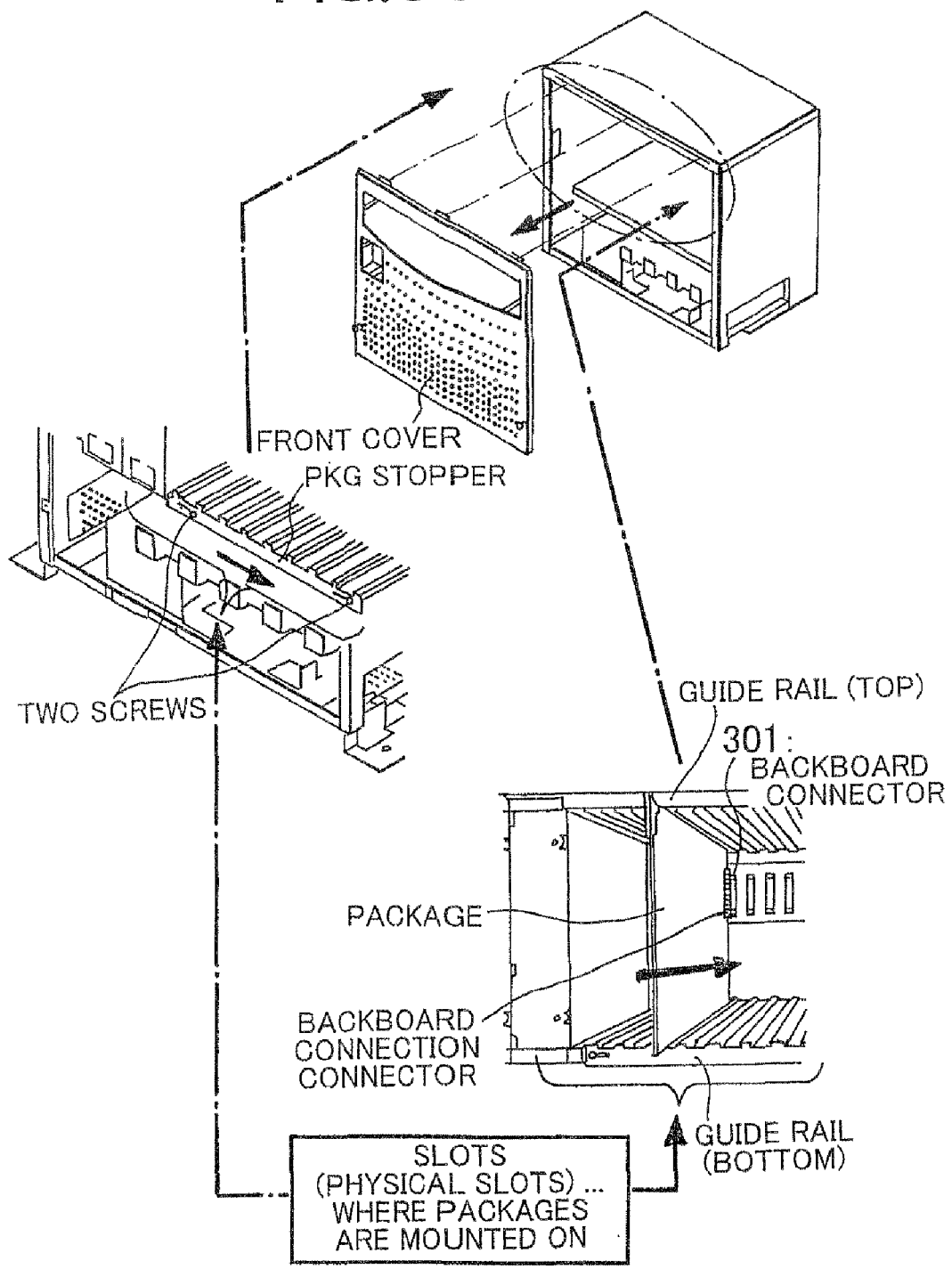
FIG. 35 is a perspective view showing the appearance of a main unit according to an embodiment of the present invention.

FIG. 35 shows an example of appearance of a main unit. The main unit has a plurality of physical slots so that packages can be inserted into the physical slots.

Figure 36:
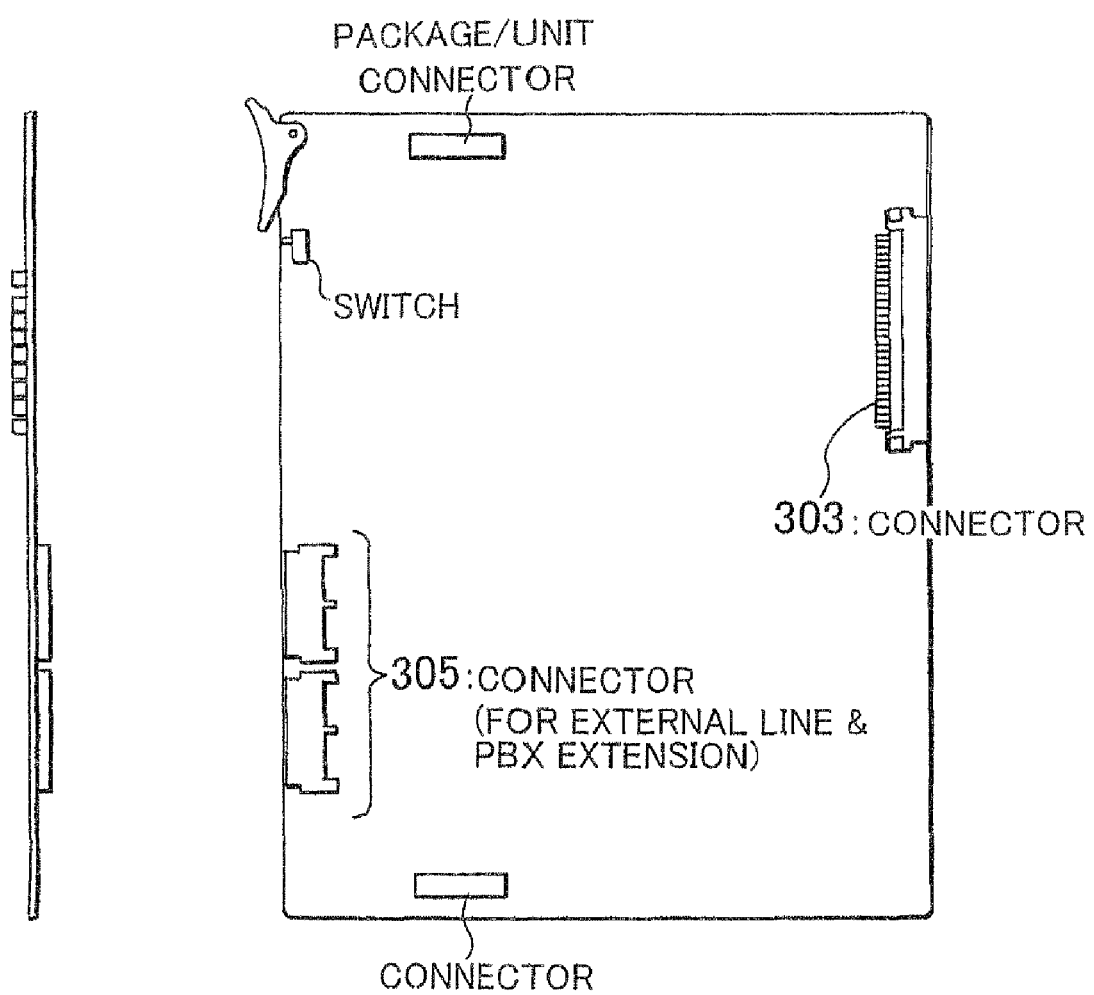
FIG. 36 shows a front view and a side view showing the appearance of a package according to the embodiment of the present invention.

FIG. 36 shows an example of appearance of a package. The package has a connector 303 to be connected with the backboard connector 301 of a physical slot (see FIG. 35), and connectors 305 to be connected with an external line and a PBX extension.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A slot interface access unit comprising a slot management module, a slot control module, and a physical slot/managed slot comparison table which are provided between an input/output control module and a slot interface subordinate thereto, wherein the input/output control module accesses the slot interface by using virtual slot identification information, wherein the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface, wherein the slot interface is architecturally lower than the input/output control module, and wherein the input/output control module is in a layer below an application layer of the slot interface access unit.

2. The slot interface access unit according to claim 1, further comprising means for adding a new virtual slot when a new slot interface is added, and adding correspondence between identification information on a slot control module corresponding to the added slot interface and identification information on the added virtual slot to the physical slot/managed slot comparison table.

3. The slot interface access unit according to claim 1, wherein the slot interface(s) and the slot control module(s) are distributed between a plurality of main units.

4. A slot interface access method carried out in a slot interface access unit comprising a slot management module, a slot control module, and a physical slot/managed slot comparison table between an input/output control module and a slot interface subordinate thereto, the method comprising:

the input/output control module accessing the slot interface by using virtual slot identification information; and the slot management module referring to the physical slot/managed slot comparison table, converting the virtual slot identification information into physical slot identification information, and accessing a slot control module corresponding to the physical slot identification information obtained by the conversion, thereby realizing a physical access of the input/output control module to the slot interface, wherein the slot interface is architecturally lower than the input/output control module, and wherein the input/output control module is in a layer below an application layer of the slot interface access unit.

5. The slot interface access method according to claim 4, further comprising adding a new virtual slot when a new slot interface is added, and adding correspondence between identification information on a slot control module corresponding to the added slot interface and identification information on the added virtual slot to the physical slot/managed slot comparison table.

6. The slot interface access method according to claim 4, wherein the slot interface(s) and the slot control module(s) are distributed between a plurality of main units.

7. A slot interface access unit comprising a slot management module, a slot control module, and a physical slot/managed slot comparison table which are provided between an input/output control module and a slot interface subordinate thereto, wherein the input/output control module accesses the slot interface by using virtual slot identification information, the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface, wherein the slot interface access unit has a CPU power higher than that of other units having a slot interface, wherein the slot interface is architecturally lower than the input/output control module, and wherein the input/output control module is in a layer below an application layer of the slot interface access unit.

8. The slot interface access unit according to claim 7, wherein the unit does not have the slot interface.

9. A group of slot interface access units, comprising:

a slot interface access unit according to claim 7; and a slot interface access unit for serving as an alternative to the slot interface access unit when the relevant slot interface access unit ceases to function properly, having a CPU power higher than that of the other unit(s).

10. An accessing method of a slot interface carried out in a slot interface access unit comprising a slot management module, a slot control module, and a physical slot/managed slot comparison table between an input/output control module and a slot interface subordinate thereto, the method comprising:

the input/output control module accessing the slot interface by using virtual slot identification information;

the slot management module referring to the physical slot/managed slot comparison table, converting the virtual slot identification information into physical slot identification information, and accessing a slot control module corresponding to the physical slot identification information obtained by the conversion, thereby realizing a physical access of the input/output control module to the slot interface; and the slot interface access unit having a CPU power higher than that of other units having a slot interface, wherein the slot interface is architecturally lower than the input/output control module, and wherein the input/output control module is in a layer below an application layer of the slot interface access unit.

11. The accessing method of a slot interface according to claim 10, wherein a unit that performs the method does not have the slot interface.

12. An accessing method of a slot interface, wherein, when the unit that performs an accessing method of a slot interface according to claim 10 ceases to function properly, a unit having a CPU power higher than that of the other units performs the method as an alternative.

13. A tangible, non-transitory computer-readable medium on which a program is recorded, said program comprising codes which, when executed, cause a computer to function as a slot interface access unit comprising a slot management module, a slot control module, and a physical slot/managed slot comparison table which are provided between an input/output control module and a slot interface subordinate thereto, wherein the input/output control module accesses the slot interface by using virtual slot identification information, wherein the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface, wherein the slot interface is architecturally lower than the input/output control module, and wherein the input/output control module is in a layer below an application layer of the slot interface access unit.

14. The tangible, non-transitory computer-readable medium according to claim 13, wherein the slot interface access unit further comprises:

means for adding a new virtual slot when a new slot interface is added, and adding correspondence between identification information on a slot control module corresponding to the added slot interface and identification information on the added virtual slot to the physical slot/managed slot comparison table.

15. The tangible, non-transitory computer-readable medium according to claim 13, wherein the slot interface(s) and the slot control module(s) are distributed between a plurality of main units.

16. A tangible, non-transitory computer-readable medium on which a program is recorded, said program comprising codes which, when executed, cause a computer to function as a slot interface access unit comprising a slot management module, a slot control module, and a physical slot/managed slot comparison table which are provided between an input/output control module and a slot interface subordinate thereto,
   wherein the input/output control module accesses the slot interface by using virtual slot identification information,
   wherein the slot management module refers to the physical slot/managed slot comparison table, converts the virtual slot identification information into physical slot identification information, and accesses a slot control module corresponding to the physical slot identification information obtained by the conversion, thereby realizing a physical access of the input/output control module to the slot interface,
   wherein the slot interface access unit has a CPU power higher than that of other units having a slot interface,
   wherein the slot interface is architecturally lower than the input/output control module, and
   wherein the input/output control module is in a layer below an application layer of the slot interface access unit.

17. The tangible, non-transitory computer-readable medium according to claim 16, wherein the slot interface access unit does not have the slot interface.

* * * * *